(12) United States Patent
King

(10) Patent No.: US 7,211,992 B2
(45) Date of Patent: *May 1, 2007

(54) ADAPTIVE DIGITAL VOLTAGE REGULATOR WITH BRESENHAM SEQUENCE GENERATOR

(75) Inventor: Paul Frederic King, Redwood City, CA (US)

(73) Assignee: Kiawe Forest LLC, Incline Village, NV (US)

( * ) Notice: Subject to any disclaimer, the term of this patent is extended or adjusted under 35 U.S.C. 154(b) by 42 days.

This patent is subject to a terminal disclaimer.

(21) Appl. No.: 11/480,608

(22) Filed: Jul. 3, 2006

(65) Prior Publication Data

US 2006/0250120 A1    Nov. 9, 2006

Related U.S. Application Data

(63) Continuation-in-part of application No. 11/280,676, filed on Nov. 17, 2005, now Pat. No. 7,109,695, and a continuation-in-part of application No. 11/180,399, filed on Jul. 12, 2005, now Pat. No. 7,098,641, and a continuation-in-part of application No. 11/008,481, filed on Dec. 8, 2004, now Pat. No. 6,992,469.

(51) Int. Cl.
*G05F 1/46* (2006.01)

(52) U.S. Cl. ...................... 323/283; 323/285

(58) Field of Classification Search ................ 323/282, 323/283, 285, 351
See application file for complete search history.

(56) References Cited

U.S. PATENT DOCUMENTS

| 5,594,324 A | * | 1/1997 | Canter et al. | ............... 323/282 |
| 6,841,979 B2 | * | 1/2005 | Berson et al. | .............. 323/282 |
| RE38,780 E | * | 8/2005 | Hawkes et al. | ............. 323/282 |
| 6,992,469 B1 | * | 1/2006 | King | .......................... 323/283 |

* cited by examiner

*Primary Examiner*—Adolf Berhane

(57) ABSTRACT

A digitally-controlled, DC/DC converter includes a switched-mode power stage for the purpose of converting an input voltage (Vin) into an output voltage (Vout); the power stage including a controllable switching device, which is turned ON and OFF by a control device with temporal resolution $\Delta t$. The converter further includes a duty cycle control mechanism for controlling the duty cycle of the controllable switching device; the duty cycle control mechanism including a mechanism for estimating the output voltage error, and a selector mechanism for determining the turn OFF and turn ON times of the controllable switching device by choosing, cycle by cycle, an ON time/OFF time pair from a working set of two quantized ON time/OFF time pairs, choosing in such a manner that the amplitude of the output voltage error is continually minimized. At each switching cycle, the current output voltage error estimate is generated, and an ON time/OFF time pair is chosen. Where the output voltage error estimate is small, the choice is determined via a Bresenham sequence generator.

11 Claims, 14 Drawing Sheets

FIG 6

| DT | DQmin ON | DQmin OFF | DQmax ON | DQmax OFF |
|---|---|---|---|---|
| 1 | 0 | 16 | 1 | 16 |
| 2 | 0 | 16 | 1 | 16 |
| 3 | 0 | 16 | 1 | 16 |
| ... | ... | ... | ... | ... |
| 55 | 6 | 9 | 7 | 8 |
| 56 | 6 | 9 | 7 | 8 |
| 57 | 7 | 10 | 8 | 9 |
| 58 | 7 | 9 | 8 | 8 |
| 59 | 7 | 10 | 8 | 8 |
| 60 | 7 | 9 | 8 | 8 |
| 61 | 7 | 9 | 8 | 8 |
| 62 | 7 | 9 | 8 | 7 |
| 63 | 8 | 9 | 9 | 7 |
| 64 | 8 | 9 | 9 | 7 |
| 65 | 8 | 9 | 9 | 7 |
| 66 | 8 | 9 | 9 | 7 |
| 67 | 8 | 9 | 9 | 7 |
| 68 | 8 | 8 | 9 | 7 |
| 69 | 8 | 8 | 9 | 6 |
| 70 | 8 | 7 | 9 | 7 |
| 71 | 8 | 7 | 10 | 6 |
| 72 | 9 | 8 | 10 | 6 |
| 73 | 9 | 8 | 10 | 6 |
| 74 | 9 | 7 | 10 | 6 |
| 75 | 9 | 7 | 10 | 6 |
| 76 | 9 | 7 | 10 | 6 |
| ... | ... | ... | ... | ... |
| 125 | 16 | 1 | 16 | 0 |
| 126 | 16 | 1 | 16 | 0 |
| 127 | 16 | 1 | 16 | 0 |

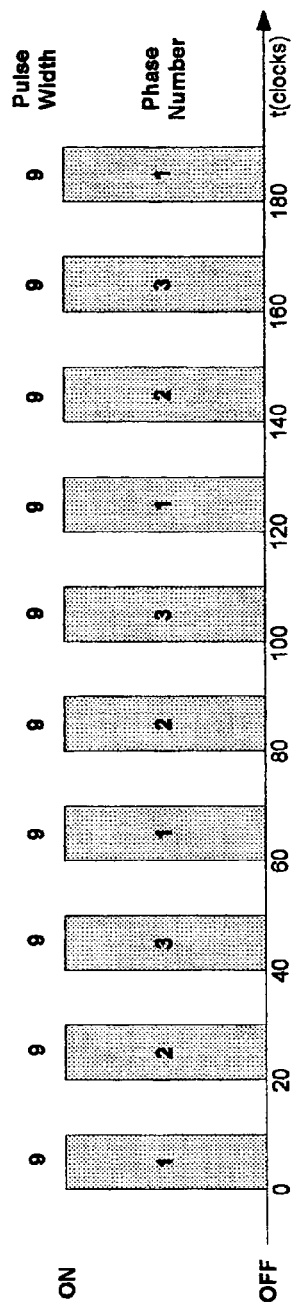
Figure 7a. Three Phase Buck Converter  $V_{IN} = 12VDC$  $V_{OUT} = 1.8VDC$
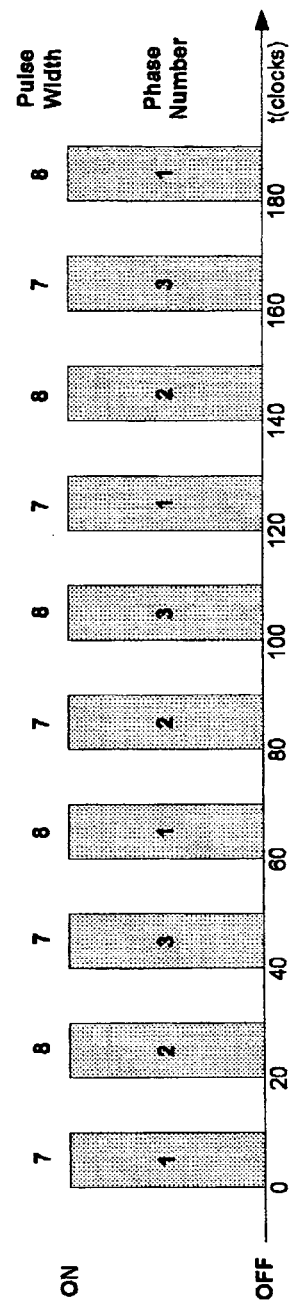
Figure 7b. Three Phase Buck Converter  $V_{IN} = 12VDC$  $V_{OUT} = 1.5VDC$

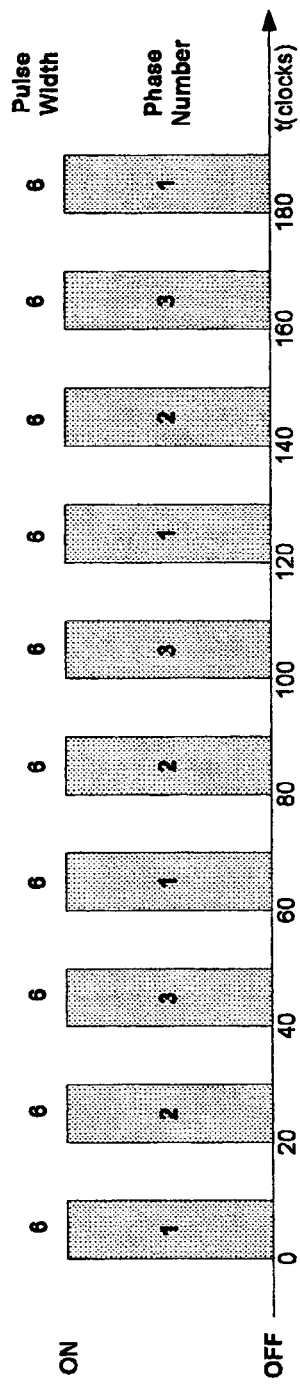
Figure 8a. Three Phase Buck Converter  $V_{IN} = 12VDC$   $V_{OUT} = 1.2VDC$
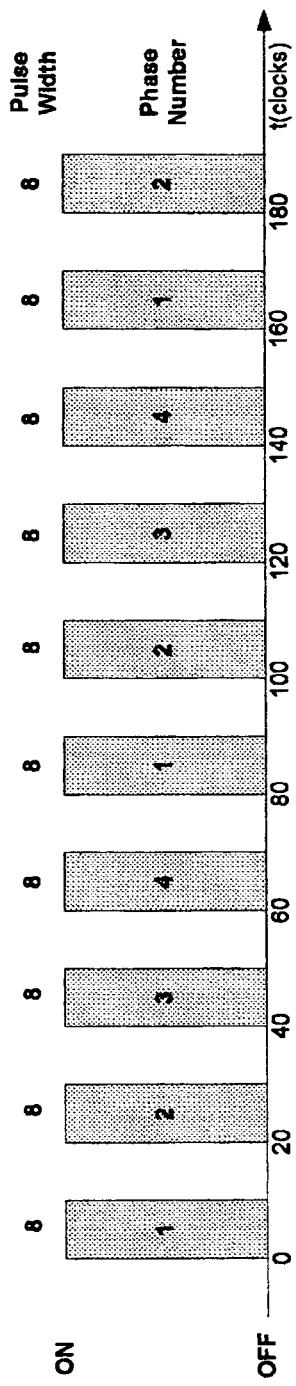
Figure 8b. Four Phase Buck Converter  $V_{IN} = 12VDC$   $V_{OUT} = 1.2VDC$

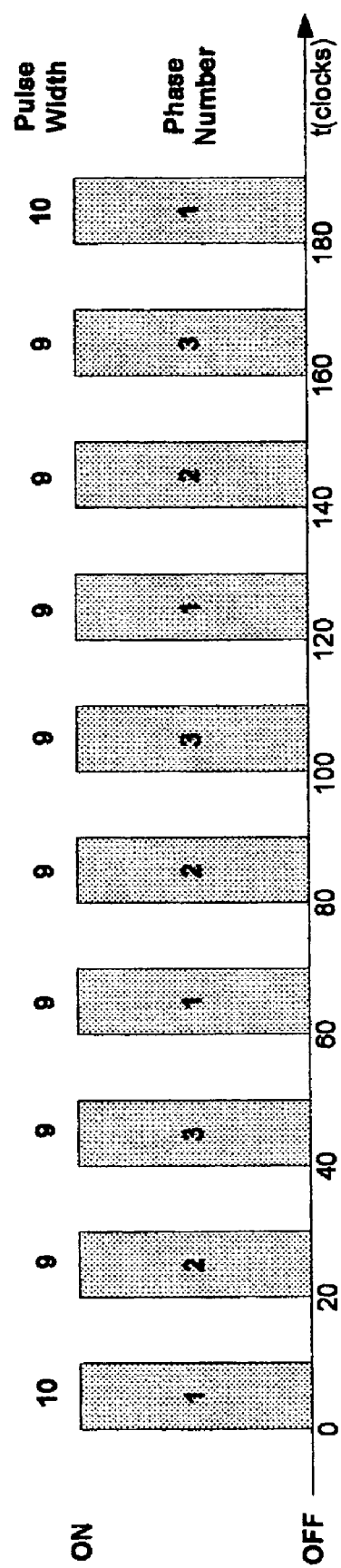
Figure 9. Three Phase Buck Converter  $V_{IN} = 12VDC$   $V_{OUT} = 1.8VDC$

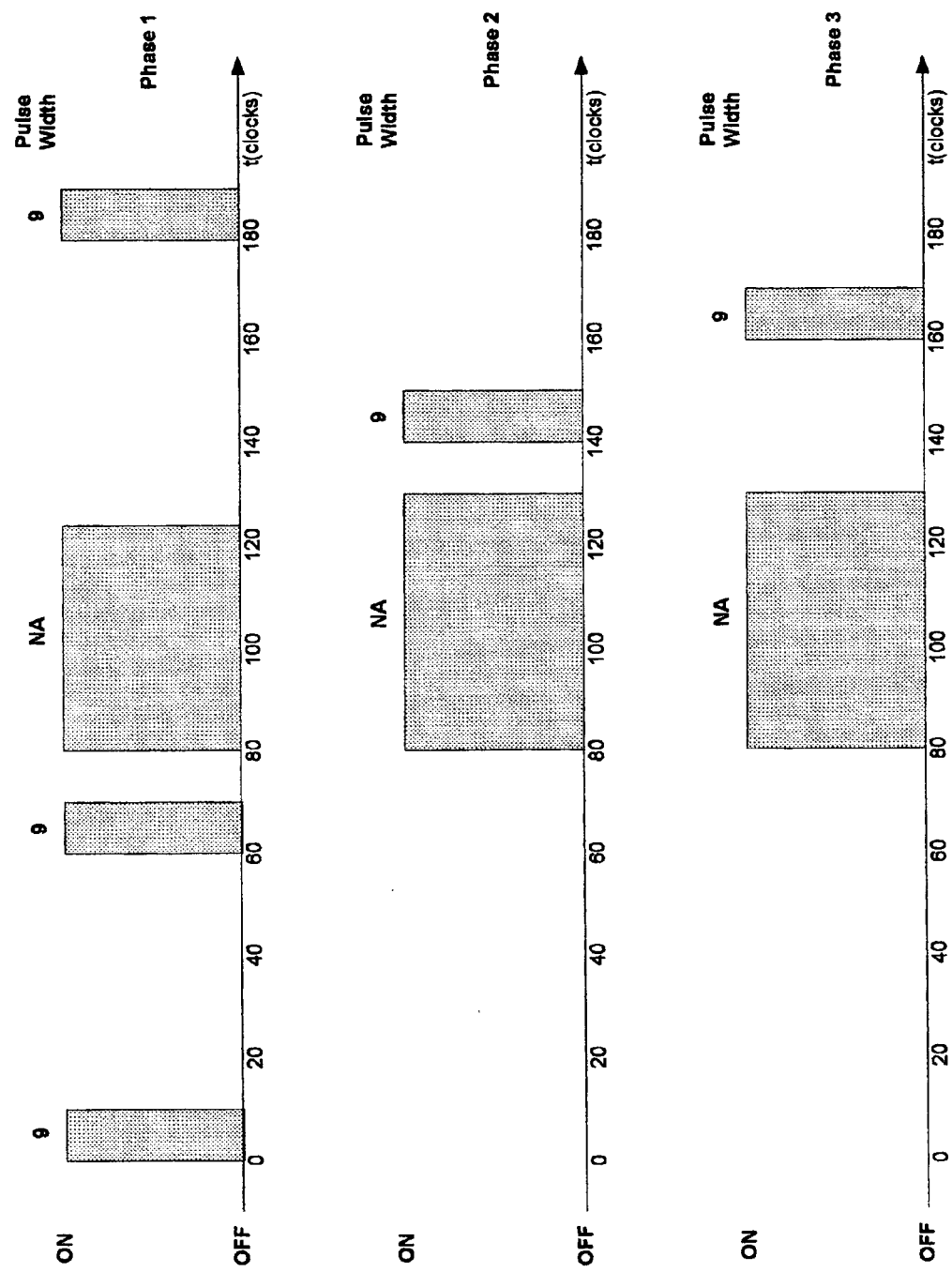
Figure 10. Three Phase Buck Converter  $V_{IN} = 12VDC$  $V_{OUT} = 1.8VDC$

ADAPTIVE DIGITAL VOLTAGE REGULATOR WITH BRESENHAM SEQUENCE GENERATOR

CROSS-REFERENCE TO RELATED APPLICATIONS

This application is a continuation-in-part application of, and claims priority under 35 U.S.C. § 120 from, Ser. No. 11/008,481 filed Dec. 8, 2004 U.S. Pat. No. 6,992,469, entitled "Digital Voltage Regulator for DC/DC Converters" issued on Jan. 31, 2006, and co-pending U.S. patent applications Ser. No. 11/180,399 now U.S. Pat. No. 7,098,641, entitled "Adaptive Digital Voltage Regulator" filed on Jul. 12, 2005, and Ser. No. 11/280,676 now U.S. Pat. No. 7,109,695, entitled "Adaptive Digital Voltage Regulator with Same-Cycle Feedback," filed on Nov. 17, 2005, the subject matter of which is incorporated by reference herein in its entirety.

STATEMENT REGARDING FEDERALLY SPONSORED RESEARCH OR DEVELOPMENT

Not Applicable

BACKGROUND OF THE INVENTION

The invention pertains generally to the field of power conversion, and more particularly to digitally-controlled switched-mode DC/DC converters.

A broad class of switched-mode DC/DC power converters exists with the property that the ratio of the average output voltage to the input voltage is determined by the average duty cycle of a controllable switching device within the power conversion stage of the converter. Examples include buck, boost, inverting buck-boost, forward, and flyback converters, operated in the continuous conduction mode (CCM). Where the input voltage (line) or the output current (load) or both vary slowly, or there is a requirement to track abrupt changes in load with minimal output voltage error, regulation of these converters is accomplished by continually estimating the output voltage error (the output voltage error being the difference between the uncorrupted output voltage and the desired output voltage) and continually adjusting the duty cycle of the switching device to compensate for changes in load conditions manifest in output voltage error estimates. In this case, the act of regulation consists of controlling, cycle by cycle, the duty cycle of the switching device in accordance with output voltage error estimates, so that the amplitude of the output voltage error is continually minimized.

Regulation mechanisms for this purpose, known as PWM regulators, generally incorporate a pulse width control mechanism and a duty cycle control mechanism, where the former generates the ON pulse appropriate to the realization of the duty cycle generated by the latter. Accordingly, the goal of the duty cycle control mechanism is to estimate the target duty cycle (the target duty cycle being the duty cycle essential to achieve the desired output voltage). A duty cycle control mechanism is commonly a feedback mechanism, driven by the output voltage error, but it could as well be a feedforward mechanism, driven by the input voltage, or it could be some combination of the two.

The most commonly used pulse width control mechanisms are analog in nature; that is they accept as input a continuously variable analog signal representing the desired duty cycle, and they output pulses of continuously variable width. As in other previously analog fields, continuous advances in integrated circuit technology have stimulated the application of digital techniques to the field of power conversion. As a result, the first digital PWM control mechanisms, replacing analog PWM control mechanisms, have been developed and are being applied together with digital duty cycle control mechanisms, to realize digital implementations of familiar analog PWM regulators. Digital PWM control mechanisms are generally implemented using a counter and a comparator or a multistage ring oscillator. In the case of the former, a faster clock (for improved temporal resolution) implies higher power dissipation, impacting efficiency. In case of the latter, more ring oscillator stages (for improved temporal resolution) implies more silicon area, impacting manufacturing cost.

Whether counter-comparator or multistage-ring-oscillator, it is the nature of digital PWM regulation mechanisms that the generated pulse widths (and consequently, the commanded duty cycles) are quantized—a consequence of the temporal resolution of the digital PWM control mechanism. If the temporal resolution of the PWM control mechanism is $\Delta t$, then the pulse widths are constrained to be integral multiples of $\Delta t$. For the purposes herein, we shall assume that switching cycles, spanning consecutive ON and OFF pulses, are likewise constrained to be integral multiples of $\Delta t$.

One challenge to those who would apply digital PWM regulation mechanisms to power converters, especially DC/DC converters employed in battery-powered mobile applications, is the challenge of achieving acceptable application performance with digital regulation mechanisms. Quantization of pulse widths translates into quantized duty cycles, which constrain the ability of any duty cycle control mechanism to limit output voltage error to an arbitrary application-dictated level.

To understand the nature of this challenge, consider a DC/DC converter in a battery powered mobile application. The switching frequency is typically set in the neighborhood of 1 MHz, to minimize the size and cost of discrete components and maximize the operating efficiency of the converter. Assuming a fixed switching frequency of 1 MHz, a digital PWM regulation mechanism operating at 16 MHz would thus be able to generate pulses widths of 0, 1/16 usec, 2/16 usec, 3/16 usec . . . 16/16 usec, translating to just 17 instantaneous duty cycles (including 0 and 1) available to the duty cycle control mechanism. To maintain the desired output voltage over a range of line and load conditions, the regulator must sequence a pair of these quantized duty cycles, one smaller than the target duty cycle, and the other larger, applying the converter's output filter to achieve a time-averaged duty cycle equal to the target duty cycle.

In one embodiment of this concept (cf. U.S. Pat. No. 5,272,614), the duty cycle control mechanism incorporates coarse and fine quantizers to effect the time averaging while the subsequent duty cycle is being computed. In another embodiment of this concept (cf. U.S. Pat. No. 6,677,733), the duty cycle control mechanism examines the output voltage error estimate within each switching cycle, and if it is positive, selects the smaller duty cycle for the next cycle of the switching device. Similarly, if the current output voltage error estimate is negative, it selects the larger duty cycle for the next cycle of the switching device. While simple and effective, this duty cycle control mechanism is limited (by the resolution of the available duty cycles) in its ability to regulate within acceptable levels of output voltage error.

To achieve acceptable levels of output voltage error, the elimination of steady-state limit cycles, characteristic of digital PWM regulated converters is generally necessary. In a paper entitled "Quantization Resolution and Limit Cycling in Digitally Controlled PWM Converters", published in the January, 2003, issue of IEEE Transactions on Power Electronics, authors Peterchev and Sanders describe the limit cycling behavior of digitally regulated, fixed frequency buck converters and enumerate a number of conditions necessary to prevent such behavior. The paper also describes the incorporation of digital dither within the duty cycle control mechanism to improve the effective resolution of the digital PWM control mechanism, applying the switching pattern approach described in U.S. Pat. No. 5,886,513, to closed loop control.

The authors noted that to achieve a regulation resolution (error) of the order of 10 mv, with an input voltage of the order of 5 volts, 10 bits of digital PWM resolution is required, implying a 1 GHz clock (in a counter-comparator implementation) or 1024 stages (in a multistage ring oscillator implementation) assuming a switching frequency of 1 MHz. On a more optimistic note, the authors presented experimental results demonstrating the application of digital dither to reduce the requisite digital PWM resolution from 10 bits to 7 bits in regulating a 4-phase buck converter. While the power dissipation associated with a 128 MHz clock may be acceptable in multiphase applications, the world of battery-powered mobile applications is another story. In mobile applications, the requirement for clock frequencies of the order of 128 MHz (or for expensive multistage ring oscillators) will delay if not preclude the adoption of digital PWM regulators.

Clearly there is a need for digital control methods that mitigate the requirement for higher clock frequencies or higher-cost controller implementations solely for the purpose of achieving acceptable output voltage error in a broad class of DC/DC converters.

BRIEF SUMMARY OF THE INVENTION

The primary objective of this invention is to provide digital control methods that mitigate the requirement for higher clock frequencies solely for the purpose of achieving acceptable output voltage error in a broad class of DC/DC converters.

To this end, a digital duty cycle control mechanism, incorporating a mechanism for estimating the output voltage error, a mechanism for estimating the target duty cycle, a novel duty cycle quantization mechanism for determining, for a target duty cycle estimate, a first set of three or more quantized duty cycles, specified in terms of their quantized ON and OFF times, and suitable for regulating the output voltage, and a novel output-voltage-error-estimate-driven duty cycle selector mechanism for determining the turn ON and turn OFF times of the switching device by choosing, cycle by cycle, from a second set of two or more quantized duty cycles, derived from the first set, is disclosed.

The novelty of the duty cycle quantization mechanism follows from the insight that the output voltage error resulting from a sequence of quantized switching cycles (a cycle being the sum of consecutive ON and OFF times) decreases as the number of quantized switching cycles available to generate the sequence increases; and that the number available can be expanded by relaxing the (prior art) premise that all switching cycles be fixed in length, cycle by cycle, under nominal load conditions. If, for example, the switching cycle were allowed to shrink/stretch by the temporal resolution of the digital PWM control mechanism, the number of available switching cycles increases three-fold, with the potential for comparable reductions in output voltage error. If the switching cycles were allowed to shrink/stretch by as much as twice the temporal resolution of the digital PWM control mechanism, the number of available switching cycles increases five-fold.

The novelty of the duty cycle selector mechanism follows from the insight that in a temporally quantized switching environment, the mechanism controlling the switch (whether feedback, feedforward, or a combination of the two) is fundamentally limited in the amount of useful information it can provide the digital PWM control mechanism at each cycling of the switch. In certain applications, practical considerations may limit the temporal resolution to as little as 4 or 5 bits. Under these circumstances, when it is impossible, in the absence of noise and in the presence of infinite computational power, to form a pulse of the width required to drive the output voltage error precisely to zero, it is especially important to respond quickly when the error changes sign, as taught in the previously cited prior art. In other words, output voltage error feedback must be immediate, even if its reliability is limited to 1 bit, to operate effectively in a temporally quantized environment.

Another novel aspect of the duty cycle selector mechanism is its Bresenham Sequence Generator, a class of mechanisms for real-time generation of high frequency dither patterns of arbitrary resolution, eliminating the requirement for pattern storage. This class of mechanisms evolves from the insight that the generation of high frequency (minimum ripple) dither patterns can be cast in the framework of the classic problem of "drawing" straight lines on matrix imaging devices.

When these insights are combined in a duty cycle control mechanism featuring a novel duty cycle quantization mechanism for determining, for a target duty cycle estimate, a first set of three or more quantized duty cycles, specified in terms of their quantized ON and OFF times, and suitable for regulating the output voltage, and a novel output-voltage-error-estimate-driven duty cycle selector mechanism for determining the turn OFF and turn ON times of the switching device by choosing, cycle by cycle, from a second set of two or more quantized duty cycles, derived from the first set, the potential for significantly reducing the output voltage error induced by quantization, relative to prior art duty cycle control mechanisms, is realized. To illustrate the latter point, the choosing of ON time/OFF time pairs, instead of ON times, means that the choice (of duty cycle) can be broken into two choices: ON time and OFF time; so that feedback measured during the ON time may be applied virtually instantaneously to regulate the output voltage.

In accordance with the present invention, a method is presented for converting an input voltage to an output voltage by means of a switched-mode DC/DC converter; the input voltage being converted into an output voltage with the aid of a power stage, including at least one controllable switch, which is turned ON and turned OFF by a control device characterized in that owing to the temporal resolution of the control device ($\Delta t$), both the turn ON and turn OFF times of the controllable switching device are constrained to be integral multiples of $\Delta t$.

Central to this method is a duty cycle control mechanism for controlling the duty cycle of the controllable switching device; the duty cycle control mechanism incorporating a mechanism for estimating the output voltage error, VE, said estimates being constrained to a set of discrete values; a mechanism for estimating the target duty cycle, DT; a duty cycle quantization mechanism for determining, for a target duty cycle estimate, a first set of three or more quantized duty cycles, specified in terms of their quantized ON and OFF times, and suitable for regulating the output voltage, characterized in that the sum of the quantized ON time and OFF time of each duty cycle (in said first set) is constrained to a set of discrete values {Tswi} (i=1, 2, . . . I) where I is a positive integer and Tswi is an integral multiple of $\Delta t$; and an output-voltage-error-driven duty cycle selector mechanism for determining the turn OFF and turn ON times of said controllable switching device by choosing, cycle by cycle, a quantized duty cycle (and its corresponding ON time/OFF time pair) from a second set of two or more quantized duty cycles, derived from said first set, choosing in such a manner that the amplitude of the output voltage error is continually minimized.

In accordance with the present invention, a switched-mode DC/DC converter is presented, comprising;

A power stage for the purpose of converting an input voltage into at least one output voltage, the power stage including at least one controllable switching device; and A control device for the purpose of turning ON and turning OFF the controllable switching device, characterized in that owing to the temporal resolution of the control device ($\Delta t$), both the turn ON and turn OFF times of the controllable switching device are constrained to be integral multiples of $\Delta t$; and A duty cycle control mechanism for controlling the duty cycle of said controllable switching device, comprising:

A mechanism for estimating output voltage error, VE; said estimates being constrained to a discrete set of values; and A mechanism for estimating the target duty cycle, DT; and A duty cycle quantization mechanism for determining, for a target duty cycle estimate, a first set of three or more quantized duty cycles, specified in terms of their quantized ON and OFF times, and suitable for regulating the output voltage, characterized in that the sum of the quantized ON time and OFF time of each duty cycle (in said first set) is constrained to a set of discrete values {Tswi} (i=1, 2, . . . I) where I is a positive integer and Tswi is an integral multiple of $\Delta t$; and An output-voltage-error-estimate-driven duty cycle selector mechanism for determining the turn OFF and turn ON times of said controllable switching device by choosing, cycle by cycle, a duty cycle (and its corresponding ON time/OFF time pair) from a second set of two or more quantized duty cycles, derived from said first set, choosing in such a manner that the amplitude of the output voltage error is continually minimized.

In a preferred embodiment, the duty cycle selector mechanism determines turn OFF and turn ON times by choosing, cycle by cycle, an ON time/OFF time pair from a set of two quantized ON time/OFF time pairs, extracted from a table (of sets) generated by an off-line duty cycle quantization procedure and indexed by the estimated target duty cycle; choosing the ON time/OFF time pair with the lower implied duty cycle when the output voltage error estimate is positive (i.e., the output voltage is higher than the desired output voltage), and the pair with the higher implied duty cycle when the output voltage error estimate is negative.

In a second preferred embodiment, the duty cycle selector mechanism determines turn OFF and turn ON times by choosing, cycle by cycle, an ON time/OFF time pair from a second set of three quantized ON time/OFF time pairs, derived from a first set of quantized ON time/OFF time pairs generated by the duty cycle quantization mechanism; choosing the ON time/OFF time pair with the lowest implied duty cycle when the output voltage error estimate is highest, and the pair with the highest implied duty cycle when the output voltage error estimate is lowest, and the remaining pair when the output voltage error estimate is neither highest nor lowest.

In a third preferred embodiment, the duty cycle selector mechanism determines turn OFF and turn ON times by choosing, cycle by cycle, an ON time/OFF time pair from a second set of six quantized ON time/OFF time pairs, derived from a first set of quantized ON time/OFF time pairs generated by the duty cycle quantization mechanism; choosing the ON time/OFF time pair with the lowest implied duty cycle when the output voltage error estimate is highest, and the pair with the highest implied duty cycle when the output voltage error estimate is lowest, and one of the remaining intermediate pairs when the output voltage error estimate is one of the corresponding intermediate values.

Those skilled in the art will understand that the digital duty cycle control mechanism of the present invention may be implemented in mixed signal circuitry including logic circuits and/or a microprocessor with appropriate software or firmware. Further, those skilled in the art will understand that the digital duty cycle control mechanism of the present invention may be applied to any DC/DC converter topology, including but not limited to buck, boost, inverting buck-boost, forward, and flyback converters.

The following figures and descriptions disclose other aspects and advantages of the proposed invention.

BRIEF DESCRIPTION OF THE DRAWINGS

Various aspects and features of the present invention may be understood by examining the following figures:

FIG. 6 is a table of variable-frequency duty cycle pairs indexed by the estimated target duty cycle.

FIG. 7a describes the switching waveforms of a three-phase buck converter.

FIG. 7b describes the switching waveforms of a three-phase buck converter.

FIG. 8a describes the switching waveforms of a three-phase buck converter.

FIG. 8b describes the switching waveforms of a four-phase buck converter.

FIG. 9 describes the switching waveforms of a three-phase buck converter.

FIG. 10 describes the switching waveforms of a three-phase buck converter.

DETAILED DESCRIPTION OF THE INVENTION

Figure 1:
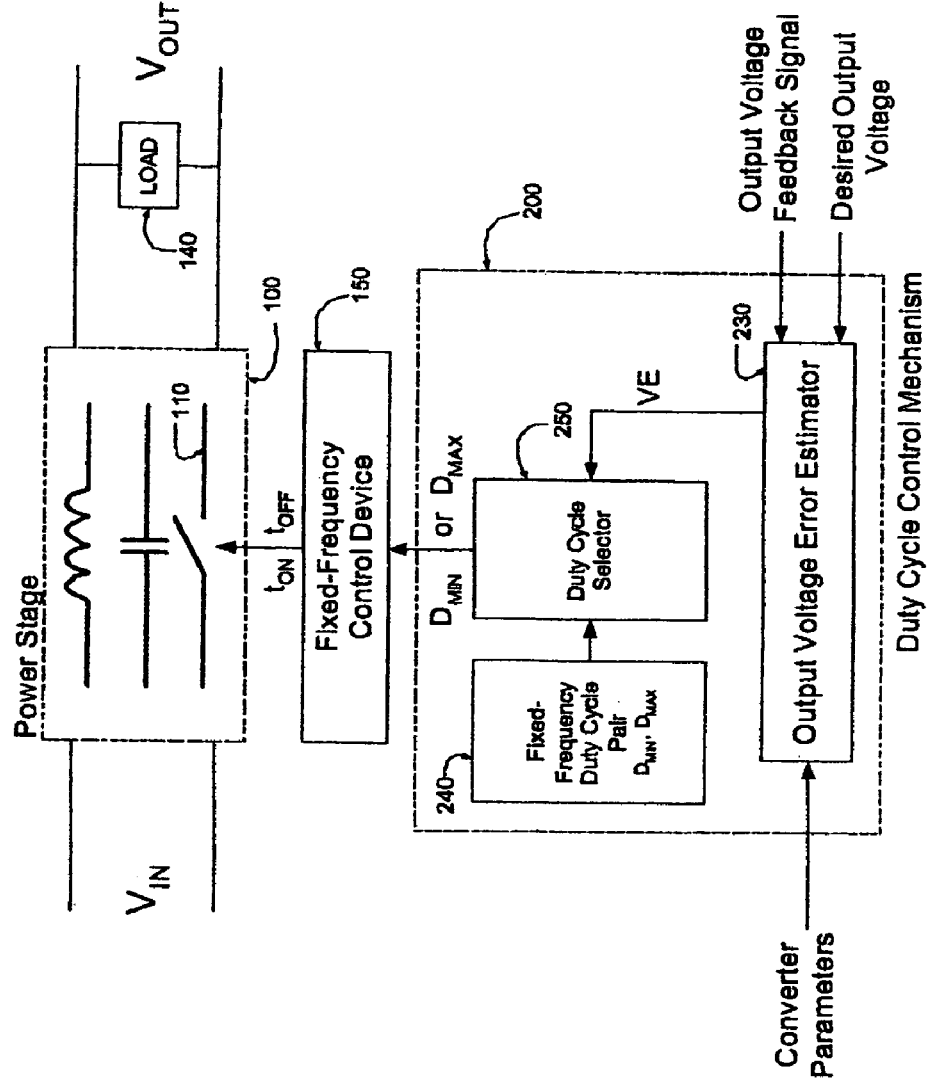
FIG. 1 is a block diagram illustrating a prior art digital duty cycle control mechanism.

A broad class of switched-mode DC/DC power converters exists with the property that the ratio of the average output voltage to the input voltage is determined by the average duty cycle of a controllable switching device within the power conversion stage of the converter. Examples include buck, boost, inverting buck-boost, forward, and flyback converters, operated in the continuous conduction mode (CCM). Where the load on the power converter varies dynamically, or there is a requirement to track changes in load with minimal output voltage error, regulation of these converters is accomplished by continually estimating the output voltage error (the output voltage error being the difference between the uncorrupted output voltage and the desired output voltage) and continually adjusting the duty cycle of the switching device to compensate for changes in load conditions manifest in output voltage error estimates. In this case, the act of regulation consists of controlling, cycle by cycle, the duty cycle of the switching device in accordance with output voltage error estimates, so that the amplitude of the output voltage error is continually minimized.

Regulation mechanisms for this purpose, known as PWM regulators, generally incorporate a pulse width control mechanism and a duty cycle control mechanism, where the former generates the ON pulse appropriate to the realization of the duty cycle generated by the latter. Accordingly, the goal of the duty cycle control mechanism is to estimate the target duty cycle (the target duty cycle being the duty cycle essential to achieve the desired output voltage). A duty cycle control mechanism is commonly a feedback mechanism, driven by the output voltage error, but it could as well be a feedforward mechanism, driven by the input voltage, or it could be some combination of the two.

(Current sense input is another input frequently available to the duty cycle control mechanism, for a variety of purposes. Most importantly, current sense input enables the duty cycle control mechanism to observe specified current limits critical to safe and/or efficient operation. Current sense input may further be applied in concert with output voltage feedback to improve the response to step changes in load. In the description that follows, discussion will focus primarily on voltage mode control, with a brief discussion on the topic of current balancing in multi-phase buck converters, near the end. The reader skilled in the art will understand that the digital duty cycle control mechanism disclosed herein may be applied with trivial modification in the case where current sense input augments output voltage feedback.)

The most commonly used pulse width control mechanisms are analog in nature; that is they accept as input a continuously variable analog signal representing the desired duty cycle, and they output pulses of continuously variable width. As in other previously analog fields, continuous advances in integrated circuit technology have stimulated the application of digital techniques to the field of power conversion. As a result, the first digital PWM control mechanisms, replacing analog PWM control mechanisms, have been developed and are being applied together with digital duty cycle control mechanisms, to realize digital implementations of familiar analog PWM regulators. It is the nature of such mechanisms that the generated pulse widths (and consequently, the commanded duty cycles) are quantized—a consequence of the temporal resolution of the digital PWM control mechanism. If the temporal resolution of the regulation mechanism is $\Delta t$, then the pulse widths are constrained to be integral multiples of $\Delta t$. For the purposes herein, we shall assume that switching cycles, spanning consecutive ON and OFF pulses, are likewise constrained to be integral multiples of $\Delta t$.

FIG. 1 describes a prior art switched-mode DC/DC power converter (cf. U.S. Pat. No. 6,677,733) comprising power stage 100 for the purpose of converting input voltage Vin to output voltage Vout; fixed-frequency control device 150 for the purpose of turning ON and turning OFF the controllable switching device 110, included in power stage 100; and duty cycle control mechanism 200 for controlling the duty cycle of switching device 110.

Because control device 150 is a fixed-frequency control device, it turns ON switching device 110 at fixed intervals, Tsw. Control device 150 turns OFF switching device 110 by translating (if necessary) duty cycle input into ON time, cycle by cycle.

The duty cycle control mechanism is comprised of an output voltage error estimator 230, a mechanism for generating, from an output voltage error signal, an estimate of the uncorrupted output voltage error, and an output-voltage-error-estimate-driven duty cycle selector 250 for determining the turn OFF and turn ON times of switching device 110, in such a manner that the amplitude of the output voltage error is continually minimized.

The output voltage error estimator frequently takes the form of a PID (proportional-integral-differential) filter, operating on an output voltage error signal. Such is the nature of output voltage error estimator 230. In duty cycle control mechanism 200, the estimate of the output voltage error is sampled by duty cycle selector 250 at the end of every switching cycle, and the value applied to select the duty cycle of the next switching cycle, thereby determining turn OFF and turn ON times of switching device 110.

Accordingly, the duty cycle selector 250 chooses, cycle by cycle, Dmin or Dmax (Dmin and Dmax having been specified as the minimum and maximum duty cycles essential to maintain the desired output voltage (Vdo) over the anticipated range of line and load conditions); choosing Dmin when the output voltage error estimate is positive (i.e., the uncorrupted output voltage is higher than the desired output voltage), and Dmax when the output voltage error estimate is negative. Regulation is achieved as the time average of consecutive duty cycle selections approaches the target duty cycle.

While the simplicity of the duty cycle control mechanism described above is appealing, the duty-cycle-quantization-induced output voltage ripple can become intolerable if the range of input voltage, and consequently the spread of Dmin and Dmax, is too wide.

Figure 2:
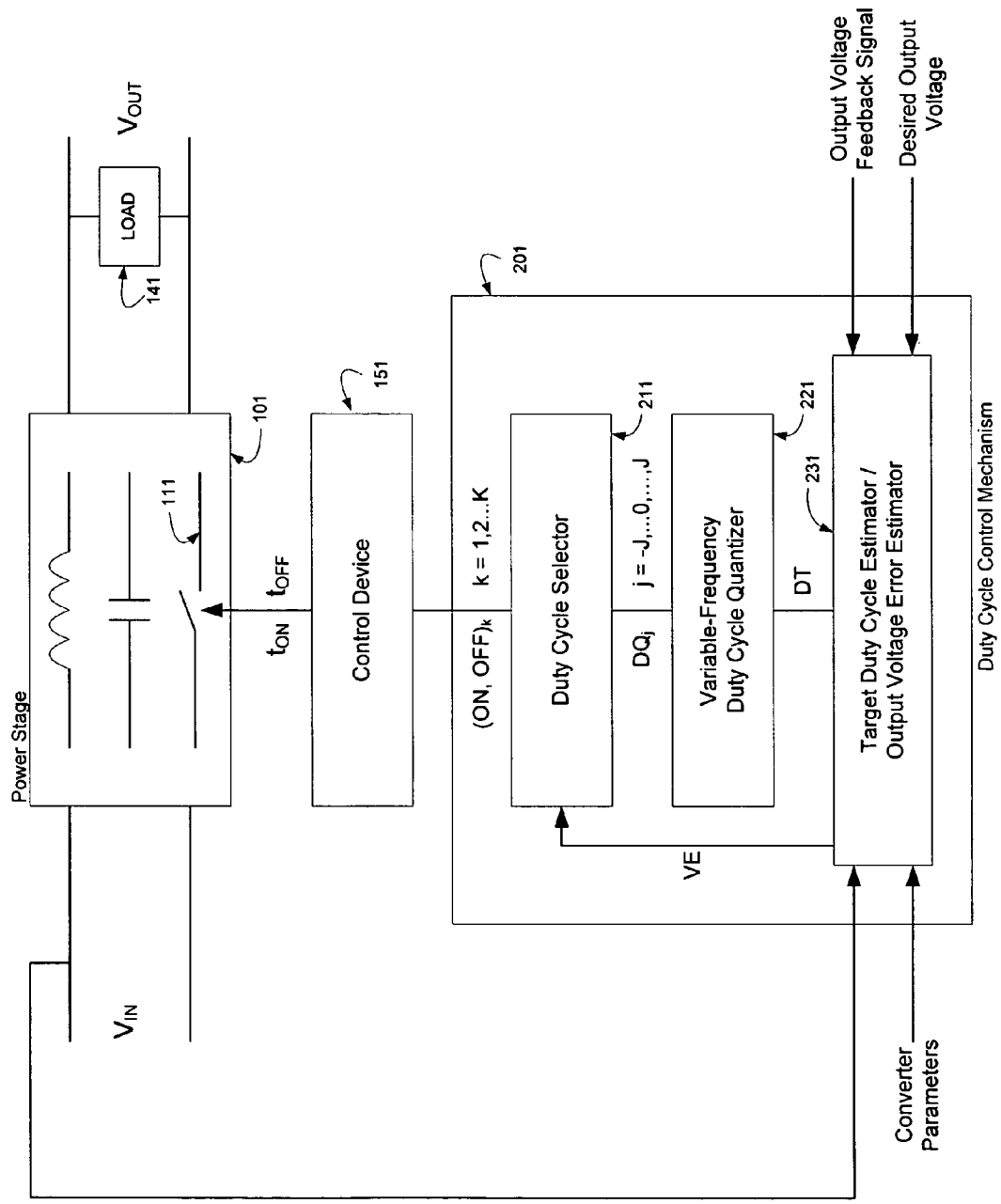
FIG. 2 is a block diagram illustrating a digital duty cycle control mechanism according to the present invention.

FIG. 2 describes a switched-mode DC/DC power converter according to the present invention, comprising power stage 101 for the purpose of converting input voltage Vin to output voltage Vout; control device 151 for the purpose of turning ON and turning OFF the controllable switching device 111, included in power stage 101; and duty cycle control mechanism 201 for controlling the duty cycle of switching device 111.

The control device 151 is further characterized in that, owing to the temporal resolution of the control device, $\Delta t$, both the turn ON and turn OFF times of the controllable switching device are constrained to be integral multiples of Δt. Because control device 151 is not a fixed-frequency control device, it must input ON times and OFF times in order to turn ON and turn OFF switching device 111.

The duty cycle control mechanism is comprised of a target duty cycle estimator/output voltage error estimator 231, a mechanism for estimating, from output voltage error signals or input voltage signals or a combination of both, the target duty cycle, DT, and the uncorrupted output voltage error, VE; a variable-frequency duty cycle quantizer 221 for determining, for a target duty cycle estimate, a first set of three or more quantized duty cycles (DQj j=−J, . . . −1, 0, 1, . . . J, ordered from lowest to highest) in the neighborhood of the target duty cycle DT, and suitable for regulating the output voltage; and an output-voltage-error-estimate-driven duty cycle selector 211, for determining the turn OFF and turn ON times of switching device 111 by choosing, cycle by cycle, a quantized duty cycle (and its corresponding ON time/Off time pair) from a second set of at least two quantized duty cycles (DQk k=1, 2, . . . K, ordered from lowest to highest) derived from the first set of quantized duty cycles DQj, choosing in such a manner that the amplitude of the output voltage error is continually minimized.

In a digital implementation, the target duty cycle estimator 231 frequently takes the form of a digital PID (proportional-integral-differential) filter, operating on an output voltage error signal. According to the present invention, the filter may operate on an input voltage signal in lieu of or in addition to the output voltage error signal. Similarly, the output voltage error estimator 231 may be implemented as a PID filter. PID filters provide the possibility of trading off delay for improved signal-to-noise ratio. Where delay must be minimized, even at the price of a less accurate output voltage error estimate, a bi-valued or tri-valued output voltage error estimate derived via binary or a ternary comparator (a binary comparator with a dead zone) is simple and effective. Such is the nature of output voltage error estimator 231. Furthermore, in duty cycle control mechanism 201, the output-voltage-error-driven duty cycle selector 211 chooses the duty cycle based on samples of the output voltage error estimate taken during the ON time or the OFF time or both.

Figure 11:
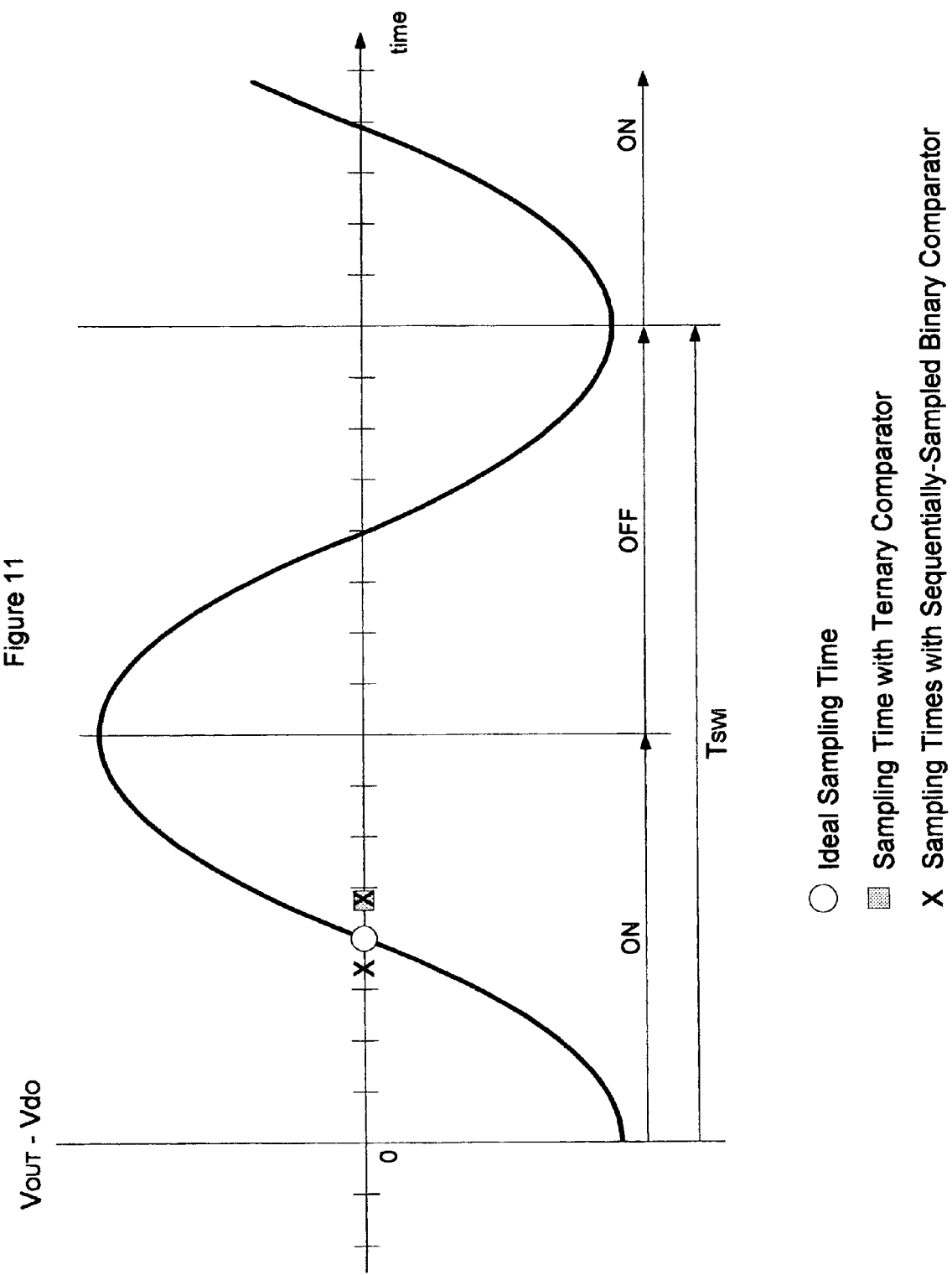
FIG. 11 describes the output voltage error waveform of a buck converter.

In the case that duty cycle selector 211 chooses the duty cycle based on samples of the output voltage error estimate taken during the ON time, the estimate of the output voltage error is sampled by duty cycle selector 211 after the turn ON time but before the choice of duty cycle has been determined, so that it may be applied (by duty cycle selector 211) in time to effect the turn OFF implicit in the chosen duty cycle. For a buck converter, where the output voltage error excursions are symmetric with respect to the mean, a bi-valued or tri-valued output voltage error estimate may be derived straightforwardly by sampling the output voltage error via a binary or a ternary comparator. Because the error voltage is sensed by a comparator, rather than by an A/D converter, the ideal error sampling time is determined by the change in the polarity of the error, as shown in FIG. 11. Inasmuch as this change in polarity occurs approximately midway through the ON time, one might use half the "average" of the ON times of DQk to determine the error sampling time. To illustrate, the sampling time referenced to the turn ON time might be set equal to ¼ (ON1+ONK), rounded up (if necessary) to the nearest multiple of Δt. (Rounding up provides compensation for delay in the path through the switch.) This computation of the sampling time must be done as often as set DQk changes. Another method for determining the sampling time is to bring the converter into regulation at start-up, and then determine empirically, by sampling the comparator at consecutive clocks, the point (referenced to the turn ON time) at which the error changes its polarity. This method has the advantage that it inherently compensates for delay in the path through the switch.

Where a buck converter is used to convert a high-level input voltage to a low-level output voltage, implying a small duty cycle (and consequently a small ON time), the output voltage error estimate may be sampled during the OFF time rather than the ON time. In this case, the choice of duty cycle would be determined, and applied (by duty cycle selector 211) in time to effect the turn ON implicit in the chosen duty cycle. Methods for determining the error sampling time (referenced to the turn OFF time) would be analogous to those outlined above for ON time sampling.

In the case that duty cycle selector 211 chooses the duty cycle based on samples of the output voltage error estimate taken during the ON time AND AGAIN during the OFF time, the estimate of the output voltage error is sampled by duty cycle selector 211 ONCE after the switching cycle has begun but before the turn OFF time has been determined, and sampled AGAIN after the turn OFF time but before the final determination of duty cycle, and its implied turn ON time. The duty cycle selector 211 applies the first sample to limit the choice of duty cycles, and in so doing determines the turn OFF time; and applies the second sample to choose, finally, the duty cycle, and in so doing determines the turn ON time, marking the end of the switching cycle. Both choices are made immediately on sampling, in time to effect the turn OFF and the turn ON implicit in the chosen duty cycle. The sampling times might be determined from an "average" of the ON and OFF times of DQk. To illustrate, the first sampling time, referenced to the turn ON time, might be set equal to ¼ (ON1+ONK) rounded up (if necessary) to the nearest multiple of Δt; the second sampling time, relative to the turn OFF time, might be set equal to ¼ (OFF1+OFFK) rounded up (if necessary) to the nearest multiple of Δt. The computation of these sampling times must be done as often as set DQk changes.

Figure 12:
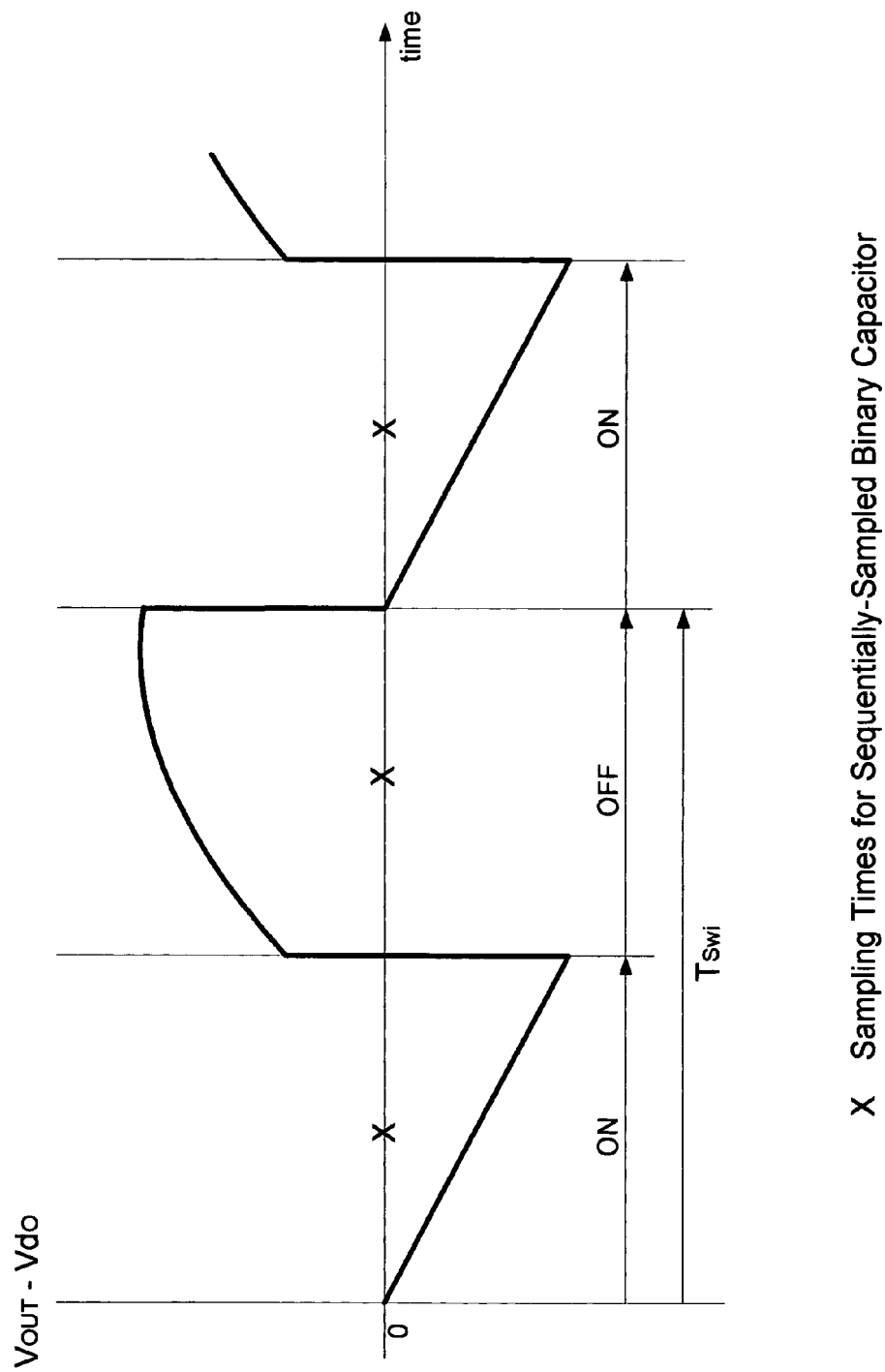
FIG. 12 describes the output voltage error waveform of a boost converter.

For a boost converter, where the output voltage error excursions are not symmetric with respect to the mean, the derivation of an output voltage error estimate is not as straightforward. In this case, a bi-valued or tri-valued output voltage error estimate is most easily constructed from two bi-valued samples of the output voltage error, separated in time but specified such that in the steady state, one sample would normally be positive and the other negative, as shown in FIG. 12. For example, the first sample could be taken ¼ (OFF1+OFFK) rounded up (if necessary) after the turn OFF time (prior to the start of a switching cycle), and the second sample ¼ (ON1+ONK) rounded up (if necessary) after the succeeding turn ON time (marking the start of a switching cycle), enabling an output voltage error estimate to be constructed and a duty cycle chosen in time to effect the turn OFF implicit in the chosen duty cycle. If both of these samples are positive, the error estimate is positive; if both samples are negative, the error estimate is negative. If one sample is positive and the other negative, the error estimate is set to zero (in the construction of a tri-valued estimate), or left unchanged from the previous value (in the construction of a bi-valued estimate).

Where it is necessary to further limit the boost converter's output voltage error, the foregoing logic may be modified so that if one sample is positive and the other negative, the output voltage error estimate is determined by evaluating the difference in the value of the output voltage at the second sample from its value in the previous switching cycle. If the difference is positive (the current value is greater than the previous value), the error estimate is positive; if the difference is negative, the error estimate is negative; if the difference is zero, the error estimate is set to zero (in the construction of a tri-valued estimate), or left unchanged from the previous value (in the construction of a bi-valued estimate).

Whether buck or boost, the duty cycle selector 211 generally chooses, cycle by cycle, a duty cycle from the set DQk (and its corresponding ON time/OFF time pair); choosing DQ1 when the aggregate output voltage error estimate is highest, DQK when the aggregate output voltage error estimate is lowest, and one of the remaining intermediate duty cycles when the aggregate output voltage error is one of the corresponding intermediate values.

Where the output voltage error estimate is bi-valued, the duty cycle selector 211 chooses, cycle by cycle, a duty cycle from the set DQk (and its corresponding ON time/OFF time pair); choosing DQ1 when the output voltage error estimate is positive (i.e., the uncorrupted output voltage is higher than the desired output voltage), and DQ2 when the output voltage error estimate is negative.

Where the output voltage error estimate is tri-valued, the duty cycle selector 211 may choose, cycle by cycle, a duty cycle from the set DQk (and its corresponding ON time/OFF time pair); choosing DQ1 when the output voltage error estimate is positive (i.e., the uncorrupted output voltage is higher than the desired output voltage), DQ3 when the output voltage error estimate is negative, and DQ2 when the output voltage error estimate is zero. Alternatively, the duty cycle selector 211 may choose, cycle by cycle, a duty cycle from the set DQk (and its corresponding ON time/OFF time pair); choosing DQ1 when the output voltage error estimate is positive (i.e., the uncorrupted output voltage is higher than the desired output voltage), DQ2 when the output voltage error estimate is negative, and a Bresenham Sequence of DQ1 and DQ2 when the output voltage error estimate is zero.

The term, Bresenham Sequence, as used herein refers to any sequence generated using scan conversion techniques, of which perhaps the most popular is the line drawing algorithm known as Bresenham's Algorithm. Further, any mechanism that generates a Bresenham Sequence is referred to herein as a Bresenham Sequence Generator (BSG). In the present context, the Bresenham Sequence Generator outputs a quantized duty cycle signal composed of high-frequency periodic signals, which are filtered to produce time-averaged dc voltage levels with increased resolution. Accordingly, the application of a Bresenham Sequence is a form of digital dithering.

Figure 13A:
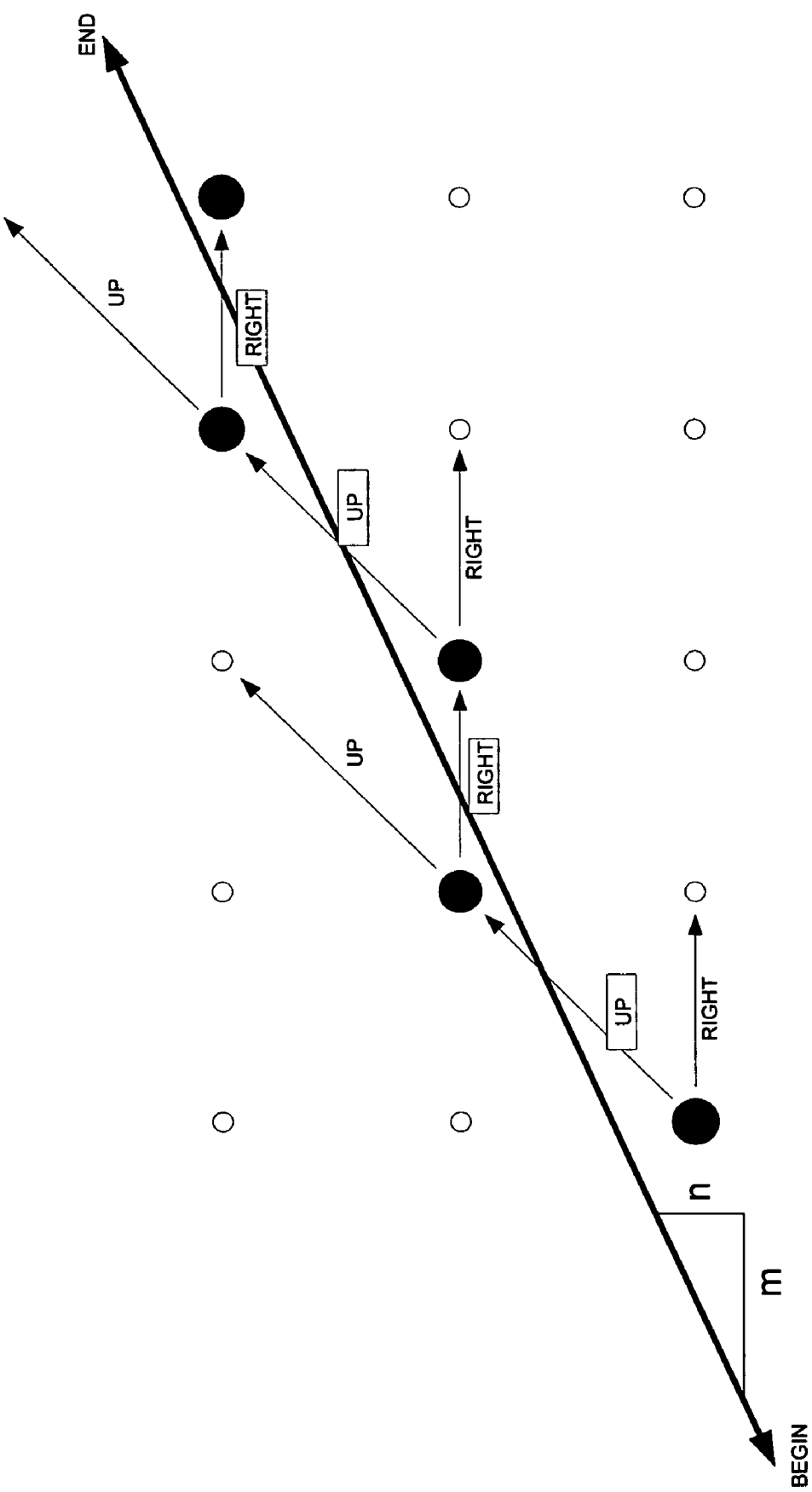
FIG. 13A is an illustration of Bresenham's Algorithm in a line drawing application.

Scan conversion techniques have many applications; one of the most popular is the "drawing" of lines on matrix imaging devices. Mechanisms implementing these techniques for line drawing differ in complexity and performance. Bresenham's Algorithm, which enables simple, high performance line drawing, has come to be the basis for most line drawing mechanisms. Bresenham-based mechanisms generate apparently straight lines between two points by moving, pixel by pixel, from a beginpoint to an endpoint, choosing pixels along the way in such a manner that chosen pixels lie close astride a perfectly straight line connecting the points. In the line drawing illustration of FIG. 13A, m is greater than n, making the x-axis the driving axis. Accordingly, Bresenham's Algorithm advances toward the endpoint by choosing, at successive points along the (driving) x-axis, to move either parallel to the (driving) x axis (RIGHT) or along a diagonal (UP), as shown. At each point, the decision has the effect of minimizing the difference between the ratio of cumulative y displacement to cumulative x displacement, and the ratio n/m.

Figure 13B:
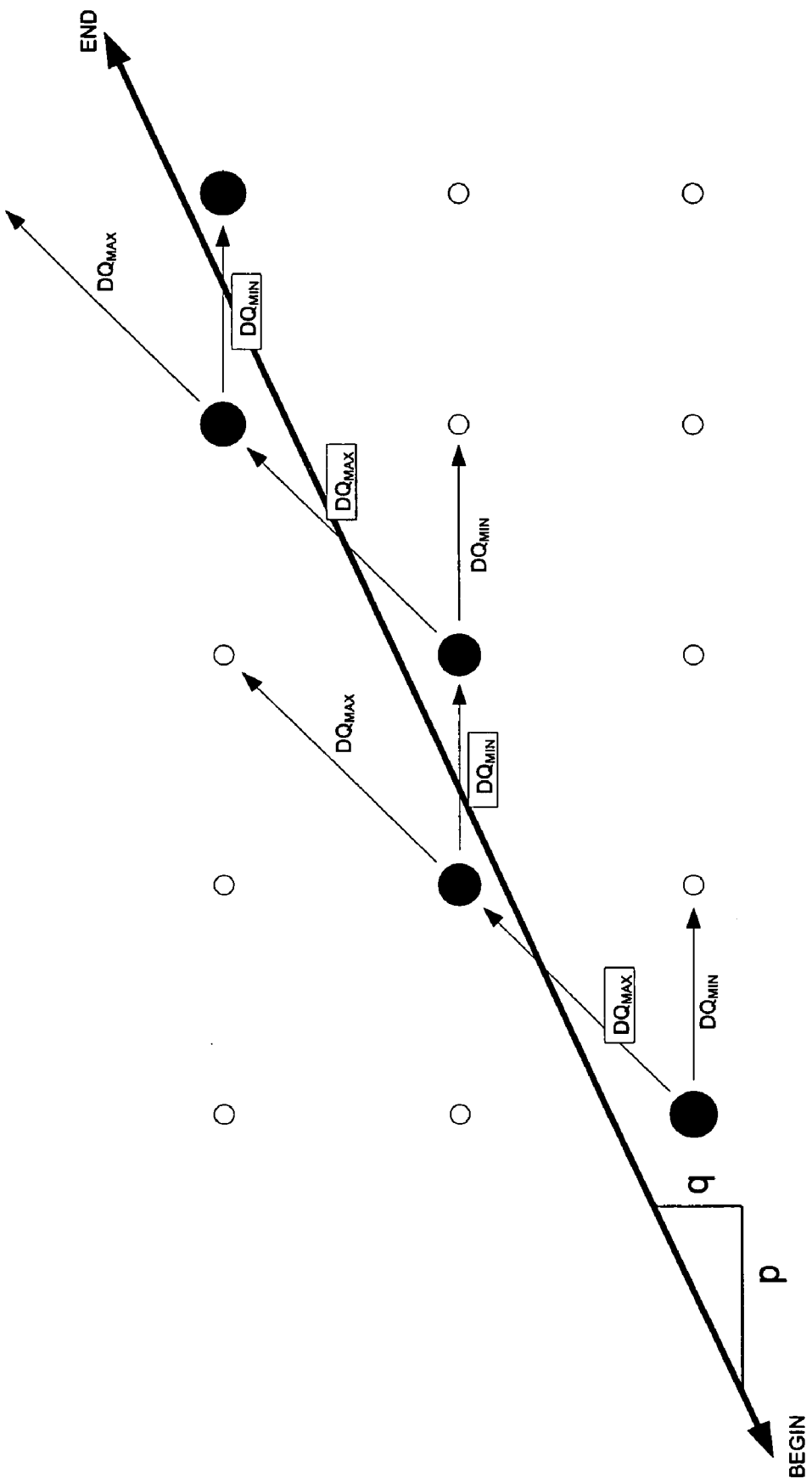
FIG. 13B is an illustration of Bresenham's Algorithm in a duty cycle sequencing application.

If quantized duty cycles DQmin and DQmax are, respectively, the smaller and larger of a pair of duty cycles to be time-averaged to DT, the problem of sequencing DQmin and DQmax to achieve a time-averaged duty cycle of DT can be cast in the framework of the line drawing problem with the x-axis the driving axis, as shown in FIG. 13B. Whereas in the line drawing problem, Bresenham's Algorithm is applied to sequence moves (RIGHT or UP), here Bresenham's Algorithm is applied to sequence quantized duty cycles (DQmin or DQmax) in such a way that each decision has the effect of minimizing the difference between the "mix ratio", that is the ratio of DQmax decisions to total decisions, and the "ideal mix ratio" implicit in duty cycles DQmin, DQmax, and DT. Accordingly the "mix ratio" is defined as q/p, where q is the number of DQmax decisions out of a total of p decisions. In FIG. 13B, p is plotted along the x-axis, and q, along the y-axis. Since p is greater than q, the x-axis is the driving axis. If the sum of the ON and OFF times of DQmax and of DQmin are designated Tmax and Tmin, respectively, then for large values of p, it can be shown that:

$$q/p = (DT - DQ\min) \times T$$
$$\min / ((DQ\max - DT) \times T\max + (DT - DQ\min) \times T\min) =$$
$$(DT \times T\min - ON\min) / ((ON\max - ON\min + DT \times (T\min - T\max)).$$

Where Tmax=Tmin, the Δerror term, q/p, simplifies to:

$$q/p = (DT - DQ\min)/(DQ\max - DQ\min)$$
$$= (DT \times T\min - ON\min)/(ON\max - ON\min).$$

(Another possibility is to run the Bresenham Sequence Generator at the clock frequency (and ahead of the converter), choosing ON or OFF at each clock, and aggregating the choices into an ON time/OFF time pair to be applied at the next duty cycle. This would require a much higher speed BSG, and in all probability increase the power dissipation beyond acceptable levels.)

In practice, p might be set to 256, and q computed (whenever DT changes) using the foregoing expression. Alternatively, the Bresenham Sequence Generator could be "initialized" (whenever DT changes) by setting the mix ratio, q/p, to 1/2, and converging it based on the mix of duty cycles commanded within subsequent mix adjustment periods or "mix adjustment windows". The convergence mechanism could employ progressively larger "mix adjustment windows" to converge on a mix ratio that provides the minimum output voltage error, subject to the precision of the BSG. Having converged on the "ideal mix ratio", this mechanism could further serve to dynamically adjust the ratio to compensate for small changes in line and load.

Once set up, the per-switching-cycle computation of the Bresenham Sequence Generator is identical to the trivial per-pixel computation of the line drawing application. At each switching cycle, the decision has the effect of minimizing the difference between the cumulative "mix ratio" and the "ideal mix ratio", equivalent to minimizing the difference between the ratio of cumulative ON time to cumulative cycle time, and DT. Hence, the goal of time-averaging to DT is achieved, with a minimum of low frequency spectral content.

The determination of the set DQj for a given value of DT, is accomplished by the variable-frequency duty cycle quantizer 221 via a three-step process: the first step being the enumeration of quantized duty cycles in the neighborhood of DT, the second step being the determination of the quantized duty cycle closest to DT, and the third step being the selection of DQj from the enumerated possibilities. The systematic enumeration of quantized duty cycles is accomplished by generating a set of quantized ON time/OFF time pairs characterized in that the sum of the quantized ON time and OFF time of each pair is constrained to a set of discrete values $\{Tswi\}$ (i=1, 2, . . . I) where I is a positive integer and Tswi is an integral multiple of $\Delta t$. This set of quantized pairs is trivially transformed into a set of quantized duty cycles. More switching cycle possibilities translates to more duty cycle possibilities in the neighborhood of DT, improving the effective temporal resolution of control device 151.

From the enumerated possibilities, the duty cycle closest to DT is designated DQ0. Generating the set DQj from the enumerated possibilities can be accomplished in a variety of ways, consistent with the constraint on the sum of the quantized ON time and OFF time of each ON time/OFF time pair, described above. To illustrate, assume that the set of allowable switching cycles $\{Tswi\}$ contains 3 elements: $(n-1)\times\Delta t$, $n\times\Delta t$, and $(n+1)\times\Delta t$. Assume further that DQ0=m/n. A very simple expansion about DQ0 could be performed by setting DQj=(m+j)/n. To provide finer resolution, DQj could be set as follows:

|  | | |
|---|---|---|
| and | DQj = (m + (j − 1)/2)/(n − 1) | if j is odd |
|  | DQj = (m + j/2)/n | if j is even |
| or | DQj = (m + (j + 1)/2)/(n + 1) | if j is odd |
| and | DQj = (m + j/2)/n | if j is even. |

Or, to provide still finer resolution, DQj could be constructed as the union of these two sets (with the elements reordered and relabelled). However constructed, the smallest and largest elements of DQj should be small enough and large enough, respectively, to span the range of duty cycles necessary to regulate the output voltage over the range of anticipated line and load variation. In the event these values cannot be determined, the computation of set DQj must be done as often as DT changes.

The working set of duty cycles, DQk, may be defined statically or dynamically; that is to say DQk may be a prescribed subset of DQj, or it may be a generally contiguous subset of DQj (or of DQjj, DQjj being a subset of DQj, culled from DQj by the duty cycle selector mechanism), dynamically adjusted for the load-dependent effects of parasitics, for example. (In this context, a generally contiguous subset of DQj is any unbroken subsequence of odd or of even or of odd and even duty cycles within DQj.)

In the case DQk is defined statically, that is DQk is a prescribed subset of DQj, consisting of duty cycles DQ−J and DQJ, for example, the output voltage error could prove intolerable, owing to the effect of parasitics, compelling a significantly higher duty cycle at high load than at low load. By defining DQk dynamically, as a generally contiguous subset of DQj (or of DQjj), adjusted upward or downward as necessary to compensate for the load-dependent effects of parasitics, the potential for superior performance is introduced.

A simple but effective mechanism for dynamically adjusting the working set of duty cycles is to (continually) keep count of the number of consecutive positive error estimates or consecutive negative error estimates, and, when it exceeds a prescribed threshold, adjust DQk down or up by repositioning or "sliding" DQk within DQj (or DQjj). DQk could be repositioned by one or more DQj (or DQjj) elements, determined by the logic of the duty cycle selector mechanism. Instead of keeping a count of consecutive positive or negative error estimates, a count of the excess of positive error estimates over negative error estimates or the excess of negative error estimates over positive error estimates, within a working set adjustment period or "working set adjustment window", might be used to adjust DQk. Both of these mechanisms could be adapted for K>3.

If a Bresenham Sequence Generator is employed to choose the duty cycle when the output voltage error estimate is zero, its mix ratio may be used to determine when to adjust the working set of duty cycles, DQk. Assuming that the mix ratio is being continually adjusted for small changes in line and load, the accumulation of small changes (of one sort or the other) drives the mix parameter toward 0 or 1, reducing the frequency of the Bresenham "dither". Accordingly, the mix ratio could be compared to, say, 1/4 and 3/4. If the ratio dropped below 1/4 or climbed above 3/4, the working set of duty cycles could be adjusted appropriately. Where working sets overlap, the mix ratio for the new working set might be computed under the assumption that the new target duty cycle is unchanged (from the old). Alternatively, the mix ratio could be reset to 1/2, and then converged using progressively larger "mix adjustment windows" (described above) to a value that provides the minimum output voltage error, subject to the precision of the BSG.

The construction of generally contiguous subsets of DQj (or of DQjj) varies with the logic of the duty cycle selector mechanism. To illustrate, suppose the duty cycle selector mechanism operates by sampling a ternary output voltage error estimate and choosing, cycle by cycle, a quantized duty cycle (and its corresponding ON time/OFF time pair) from a set of three quantized duty cycles. In this case, DQk might be constructed from 3 consecutive (odd and even) elements of DQj. This construction would enable effortless repositioning of DQk to compensate for the load-dependent effects of parasitics. Alternatively, suppose the duty cycle selector mechanism operates by sampling a ternary output voltage error estimate and choosing, cycle by cycle, a quantized duty cycle (and its corresponding ON time/OFF time pair) from a set of two quantized duty cycles, commanding a Bresenham Sequence of the two when the output voltage error estimate is zero. In this case, DQk might be constructed from 2 consecutive odd or even elements of DQj. This construction would also enable effortless repositioning of DQk.

The mechanism for dynamically adjusting the working set of duty cycles, detailed in the preceding paragraphs, can also be used at startup. Operating on a recursively-generated sequence of startup duty cycle sets, the mechanism is effective in starting up converters from a powered-down state.

More significantly, because this mechanism can be used to compensate for variations in line voltage (Vin) as well as the load-dependent effects of parasitics, it obviates the need for a target duty cycle estimator. To illustrate, suppose Dmin and Dmax are the minimum and maximum duty cycles essential to maintain the desired output voltage (Vdo) across the range of specified line and load conditions. With a trivial elaboration, variable-frequency duty cycle quantizer 221 would be able to construct a "complete" set of quantized duty cycles suitable to maintain regulation without a target duty cycle estimator. These (minimum and maximum) duty cycles could take the form of operating parameters embedded in the duty cycle control logic, or they might be deduced in the course of the startup of the converter. Alternatively, a table of working duty cycle sets DQk could be constructed off-line and embedded in duty cycle control mechanism 201, simplifying duty cycle selector 211 and eliminating variable-frequency duty cycle quantizer 221. In many cases, the aforementioned table could be virtualized; that is, a modest amount of logic, embedded in the dynamic adjustment mechanism of duty cycle selector 211, could be employed to reposition the working set of duty cycles by computing a new set from the old, rather than by referencing said table. The replacement of said table with a modest amount of logic could have the effect of further reducing the cost of duty cycle control mechanism 201.

The application of variable-frequency duty cycle quantization, same-cycle output voltage feedback with Bresenham sequencing, and dynamic adjustment of the working set of duty cycles to compensate for the variations in input voltage (Vin) as well as the load-dependent effects of parasitics significantly improve static and dynamic performance, at minimal computational cost. While the duty cycle control mechanism described above has implicit performance limitations similar in nature to those of prior art duty cycle control mechanisms, the effects of duty cycle quantization on performance are substantially reduced, without introducing application dependencies.

Figure 3:
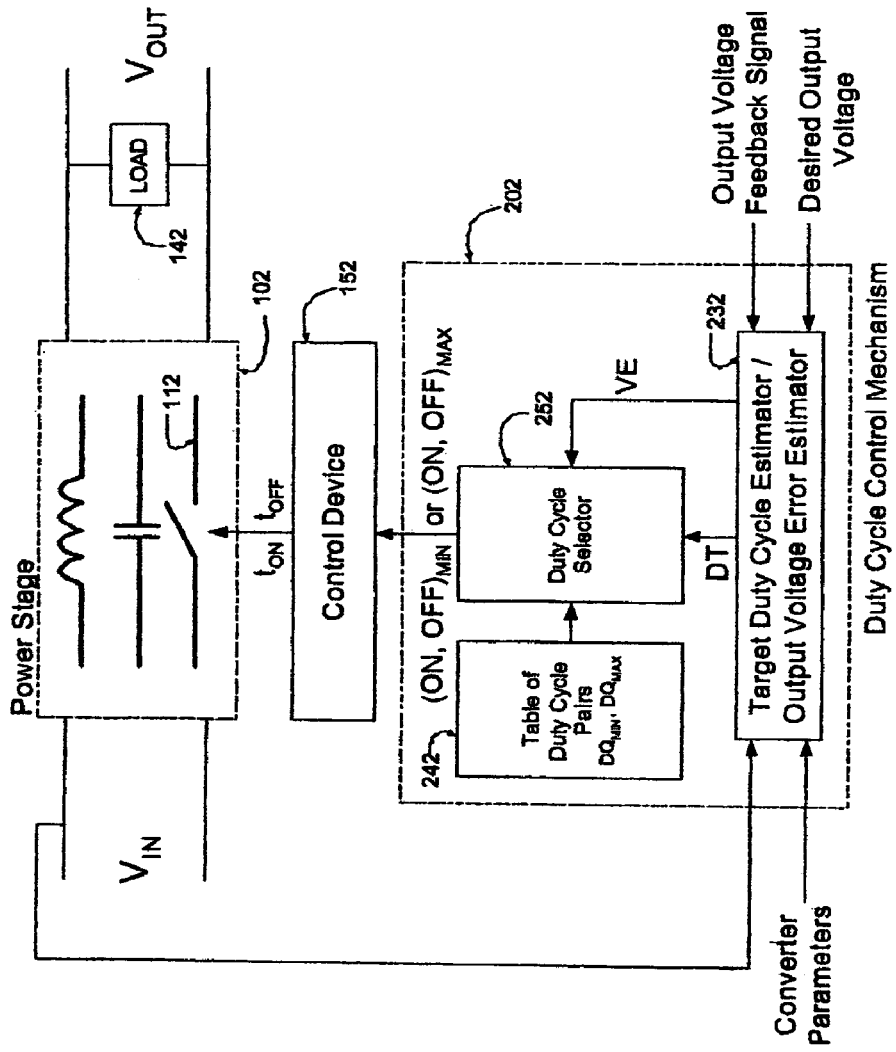
FIG. 3 is a block diagram illustrating one embodiment of a digital duty cycle control mechanism according to the present invention.

FIG. 3 describes a switched-mode DC/DC power converter according to the present invention, comprising power stage 102 for the purpose of converting input voltage Vin to output voltage Vout; control device 152 for the purpose of turning ON and turning OFF the controllable switching device 112, included in power stage 102; and duty cycle control mechanism 202 for controlling the duty cycle of switching device 112.

The control device 152 is further characterized in that, owing to the temporal resolution of the control device, $\Delta t$, both the turn ON and turn OFF times of the controllable switching device are constrained to be integral multiples of $\Delta t$. Because control device 152 is not a fixed-frequency control device, it must input ON times and OFF times in order to turn ON and turn OFF switching device 112.

The duty cycle control mechanism is comprised of a target duty cycle estimator/output voltage error estimator 232, a mechanism for estimating, from an output voltage error signal or an input voltage signal or a combination of both, the target duty cycle, DT, and the uncorrupted output voltage error, VE; and an output-voltage-error-estimate-driven duty cycle selector 252, for determining the turn OFF and turn ON times of switching device 112 by choosing, cycle by cycle, a quantized duty cycle (and its corresponding quantized ON time/OFF time pair) from a pair of quantized duty cycles (DQmin and DQmax, bracketing DT), extracted from a table of duty cycle pairs 242 generated off-line according to the variable-frequency duty cycle quantization procedure described below and indexed by the estimated target duty cycle, DT; choosing in such a manner that the amplitude of the output voltage error is continually minimized.

In a digital implementation, the target duty cycle estimator 232 frequently takes the form of a digital PID (proportional-integral-differential) filter, operating on an output voltage error signal. According to the present invention, the filter may operate on an input voltage signal in lieu of or in addition to the output voltage error signal. Similarly, the output voltage error estimator 232 may be implemented as a PID filter. PID filters provide the possibility of trading off delay for improved signal-to-noise ratio. Where delay must be minimized, a bi-valued output voltage error estimate derived via a binary comparator is simple and effective. Such is the nature of output voltage error estimator 232. Furthermore, in duty cycle control mechanism 202, the output voltage error is sampled by duty cycle selector 252 after the turn ON time but before the choice of duty cycle has been determined, so that it may be applied (by duty cycle selector 252) in time to effect the turn OFF implicit in the chosen duty cycle.

For a buck converter, where the output voltage error excursions are symmetric with respect to the mean, the output voltage error estimate may be derived straightforwardly by sampling the output voltage error via a binary comparator. The error sampling time is determined by averaging the ON times of DQmin and DQmax; specifically, the sampling time referenced to the turn ON time is set equal to ¼ (ONmin+ONmax), rounded up (if necessary) to the nearest multiple of $\Delta t$. The computation of the sampling time must be done as often as DT changes; however, it could be avoided entirely by incorporating pair-associated sampling times, buck or boost (see below), into table 242.

For a boost converter, where the output voltage error excursions are not symmetric with respect to the mean, the derivation of an output voltage error estimate is not as straightforward. In this case, a bi-valued output voltage error estimate is most easily constructed from two bi-valued samples of the output voltage error, separated in time but specified such that in the steady state, one sample would normally be positive and the other negative. For example, the first sample could be taken ¼ (OFFmin+OFFmax) after the turn OFF time (prior to the start of a switching cycle), and the second sample ¼ (ONmin+ONmax) after the succeeding turn ON time (marking the start of a switching cycle), enabling an output voltage error estimate to be constructed and a duty cycle chosen in time to effect the turn OFF implicit in the chosen duty cycle. If both of these samples are positive, the error estimate is positive; if both samples are negative, the error estimate is negative. If one sample is positive and the other negative, the error estimate is left unchanged from the previous value.

Where it is necessary to further limit the boost converter's output voltage error, the foregoing logic may be modified so that if one sample is positive and the other negative, the output voltage error estimate is determined by evaluating the difference in the value of the output voltage at the second sample from its value in the previous switching cycle. If the difference is positive (the current value is greater than the previous value), the error estimate is positive; if the difference is negative, the error estimate is negative; if the difference is zero, the error estimate is left unchanged from the previous value.

Whether buck or boost, the duty cycle selector 252 chooses, cycle by cycle, DQmin or DQmax (and its corresponding ON time/OFF time pair), DQmin and DQmax having been extracted from table 242, indexed by DT; choosing DQmin when the aggregate output voltage error estimate is positive (i.e., the uncorrupted output voltage is higher than the desired output voltage), and DQmax when the aggregate output voltage error estimate is negative.

The content and construction of the table of duty cycle pairs 242 is illustrated in FIG. 6. The procedure for determining DQmin and DQmax for a given value of DT consists of a two-step process, the first step being the enumeration of quantized duty cycles in the neighborhood of DT, and the second step being the selection of DQmin and DQmax from the enumerated possibilities. The systematic enumeration of quantized duty cycles is accomplished by generating a set of quantized ON time/OFF time pairs characterized in that the sum of the quantized ON time and OFF time of each pair is constrained to a set of discrete values {Tswi} (i=1, 2, ... I) where I is a positive integer and Tswi is an integral multiple of $\Delta t$. This set of quantized pairs is trivially transformed into a set of quantized duty cycles. More switching cycle possibilities translates to more duty cycle possibilities, making it easier to select duty cycles close astride DT, a critical factor in the minimization of quantization-induced output voltage error.

One method of choosing DQmin and DQmax is to search the space of quantized duty cycles in the neighborhood of DT and choose the closest on either side of DT. Experience has taught that these choices may be problematic (with respect to output voltage error) when one of the chosen duty cycles is much closer to DT than the other. In that case, it is preferable to reject the closer in favor of the second (or third) closest duty cycle on the same "side" of DT as the rejected duty cycle. Once DQmin and DQmax are determined, the associated ON time/OFF time pairs, designated (ON, OFF)min and (ON, OFF)max, are derived trivially.

To estimate the size of table 242, consider the example of a duty cycle control mechanism with a 16 MHz clock, controlling a power stage with a nominal switching frequency of 1 MHz (16 clocks per nominal switching cycle), where switching cycles are allowed to vary±one clock period from nominal (the assumptions used to construct the table in FIG. 6). If the ON and OFF times associated with DQmax were encoded relative to the ON and OFF times associated with DQmin, table 242 could be implemented as a 12×128 array.

The simplicity of the duty cycle control mechanism described above is appealing. The computational advantages of having a table of duty cycle pairs available, comes at the cost of a modest amount of infrequently-accessed memory. Nevertheless the combination of variable-frequency duty cycle quantization and same-cycle output voltage feedback significantly improves static and dynamic performance. While the duty cycle control mechanism described above has implicit performance limitations similar in nature to those of prior art duty cycle control mechanisms, the effects of duty cycle quantization on performance are substantially reduced, without introducing application dependencies.

Figure 4:
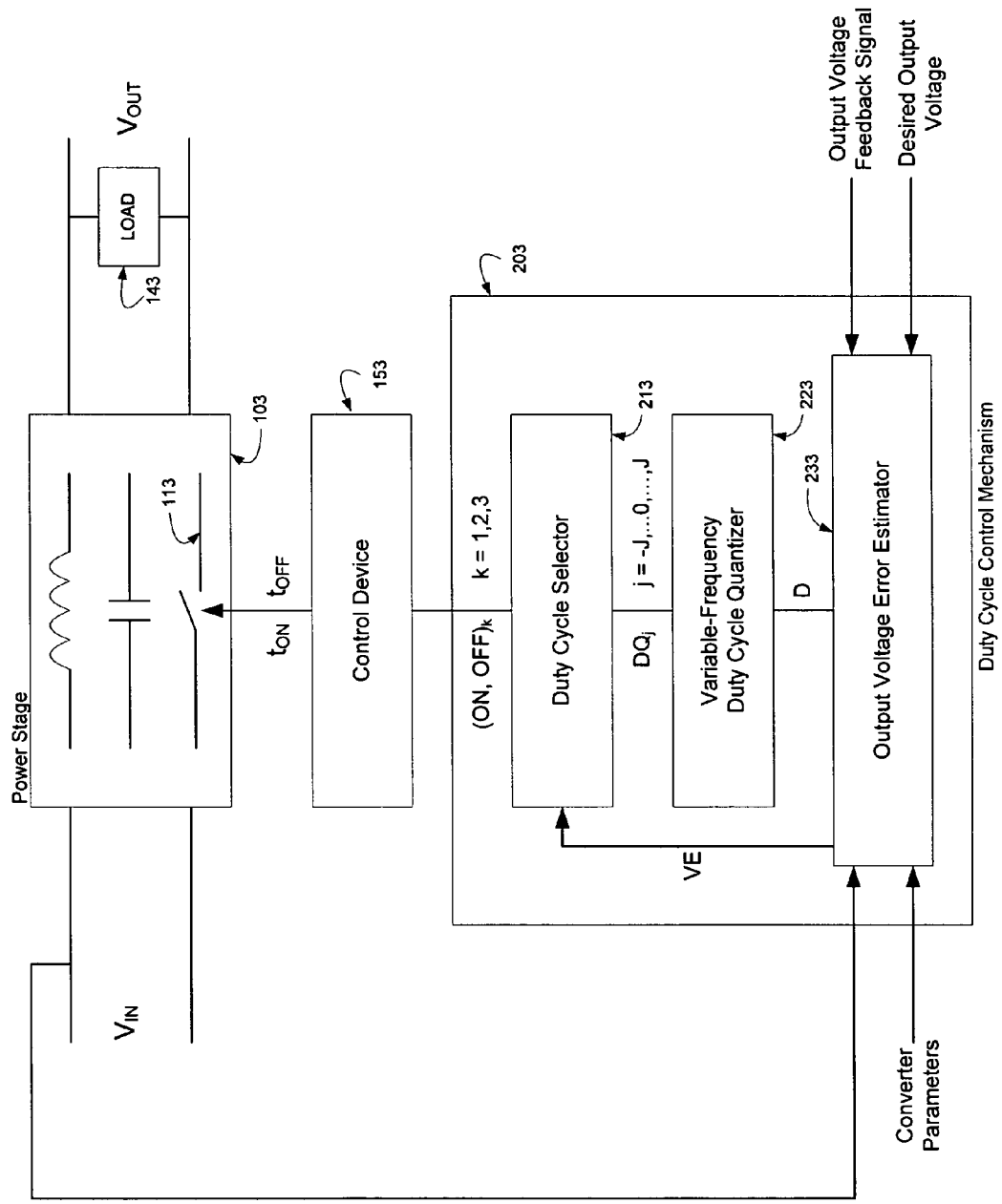
FIG. 4 is a block diagram illustrating a second embodiment of a digital duty cycle control mechanism according to the present invention.

FIG. 4 describes a switched-mode DC/DC power converter according to the present invention, comprising power stage 103 for the purpose of converting input voltage Vin to output voltage Vout; control device 153 for the purpose of turning ON and turning OFF the controllable switching device 113, included in power stage 103; and duty cycle control mechanism 203 for controlling the duty cycle of switching device 113.

The control device 153 is further characterized in that, owing to the temporal resolution of the control device, $\Delta t$, both the turn ON and turn OFF times of the controllable switching device are constrained to be integral multiples of $\Delta t$. Because control device 153 is not a fixed-frequency control device, it must input ON times and OFF times in order to turn ON and turn OFF switching device 113.

The duty cycle control mechanism is comprised of an output voltage error estimator 233, a mechanism for estimating, from an output voltage error signal, the uncorrupted output voltage error, VE; a variable-frequency duty cycle quantizer 223 for determining, from Dmin and Dmax, duty cycles defining the minimum and maximum duty cycles essential to maintain the desired output voltage (Vdo) over the anticipated range of line and load variation, a first set of three or more quantized duty cycles (DQj j=−J, ... −1, 0, 1, ... J, ordered from lowest to highest), and suitable for regulating the output voltage over the anticipated range of line and load variation; and an output-voltage-error-estimate-driven duty cycle selector 213, for determining the turn OFF and turn ON times of switching device 113 by choosing, cycle by cycle, a quantized duty cycle (and its corresponding ON time/OFF time pair) from a second set of three quantized duty cycles (DQmin, DQ, and DQmax, ordered from lowest to highest) derived from the first set of quantized duty cycles DQj, choosing in such a manner that amplitude of the output voltage error is continually minimized.

In a digital implementation, the output voltage error estimator 233 may be implemented as a PID filter. PID filters provide the possibility of trading off delay for improved signal-to-noise ratio. Where delay must be minimized, and dynamic response is important, a tri-valued output voltage error estimate derived via a ternary comparator (a binary comparator with a dead zone) is simple and effective. Such is the nature of output voltage error estimator 233. Furthermore, in duty cycle control mechanism 203, the estimate of the output voltage error is sampled by duty cycle selector 213 after the turn ON time but before the choice of duty cycle has been determined, so that it may be applied (by duty cycle selector 213) in time to effect the turn OFF implicit in the chosen duty cycle.

For a buck converter, where the output voltage error excursions are symmetric with respect to the mean, the output voltage error estimate may be derived straightforwardly by sampling the output voltage error via a ternary comparator. The sampling time is determined by averaging the ON times of DQmin and DQmax; specifically, the sampling time referenced to the turn ON time is set to equal ¼ (ONmin+ONmax), rounded up (if necessary) to the nearest multiple of $\Delta t$. The computation of the sampling time must be done as often as DQk changes.

(It is noted here that the tri-valued output voltage error estimate could also be constructed from two bi-valued error samples separated in time but specified such that in the steady state, one sample would normally be positive and the other negative.)

For a boost converter, where the output voltage error excursions are not symmetric with respect to the mean, the derivation of an output voltage error estimate is not as straightforward. In this case, a tri-valued output voltage error estimate is most easily constructed from two bi-valued samples of the output voltage error, separated in time but specified such that in the steady state, one sample would normally be positive and the other negative. For example, the first sample could be taken ¼ (OFFmin+OFFmax) after the turn OFF time (prior to the start of a switching cycle), and the second sample ¼ (ONmin+ONmax) after the succeeding turn ON time (marking the start of a switching cycle), enabling an output voltage error estimate to be constructed and a duty cycle chosen in time to effect the turn OFF implicit in the chosen duty cycle. If both of these samples are positive, the error estimate is positive; if both samples are negative, the error estimate is negative. If one sample is positive and the other negative, the error estimate is zero (neither positive nor negative).

Where it is necessary to further limit the boost converter's output voltage error, the foregoing logic may be modified so that if one sample is positive and the other negative, the output voltage error estimate is determined by evaluating the difference in the value of the output voltage at the second sample from its value in the previous switching cycle. If the difference is positive (the current value is greater than the previous value), the error estimate is positive; if the difference is negative, the error estimate is negative; if the difference is zero, the error estimate is zero (neither positive nor negative).

Whether buck or boost, the duty cycle selector 213 chooses, cycle by cycle, DQmin or DQ or DQmax (and its corresponding ON time/OFF time pair); choosing DQmin when the aggregate output voltage error estimate is positive (i.e., the uncorrupted output voltage is higher than the desired output voltage), DQmax when the aggregate output voltage error estimate is negative, and DQ when the aggregate output voltage error estimate is zero (neither positive nor negative).

The determination of the set DQj for specified duty cycles Dmin and Dmax is accomplished by the variable-frequency duty cycle quantizer 223 via a three-step process: the first step being the enumeration of quantized duty cycles in the neighborhood of D where D is the mean of Dmin and Dmax, the second step being the determination of the quantized duty cycle closest to D, and the third step being the selection of DQj from the enumerated possibilities. The systematic enumeration of quantized duty cycles is accomplished by generating a set of quantized ON time/OFF time pairs characterized in that the sum of the quantized ON time and OFF time of each pair is constrained to a set of discrete values {Tswi} (i=1, 2, ... I) where I is a positive integer and Tswi is an integral multiple of $\Delta t$. This set of quantized pairs is trivially transformed into a set of quantized duty cycles. More switching cycle possibilities translates to more duty cycle possibilities in the neighborhood of D, improving the effective temporal resolution of control device 153.

From the enumerated possibilities, the duty cycle closest to D is designated DQ0. Generating the set DQj from the enumerated possibilities can be accomplished in a variety of ways, consistent with the constraint on the sum of the quantized ON time and OFF time of each ON time/OFF time pair, described above. To illustrate, assume that the set of allowable switching cycles {Tswi} contains 3 elements: $(n-1)\times\Delta t$, $n\times\Delta t$, and $(n+1)\times\Delta t$. Assume further that DQ0=m/n. A very simple expansion about DQ0 could be performed by setting DQj=(m+j)/n. To provide finer resolution, DQj could be set as follows:

| | | |
|---|---|---|
| and | DQj = (m + (j − 1)/2)/(n − 1) | if j is odd |
|  | DQj = (m + j/2)/n | if j is even |
| or |  |  |
| and | DQj = (m + (j + 1)/2)/(n + 1) | if j is odd |
|  | DQj = (m + j/2)/n | if j is even. |

Or, to provide still finer resolution, DQj could be constructed from the union of these two sets (with the elements reordered and relabelled). Duty cycle quantizer 223 constructs DQj from the first of the two sets. J is set to the smallest value of j for which (m+j/2)/n is greater than Dmax, insuring that elements of DQj are small enough and large enough to maintain Vout over the range of anticipated line and load variation. At J=4, the number of duty cycles available to the duty cycle selector 213 is 9, ranging from (m−2)/n to (m+2)/n.

Working sets DQk, are constructed by duty cycle selector 213 as sets of 3 consecutive elements of DQj, beginning at any value of j from −J to (J−2), and adjusted, as necessary, by one DQj position. If it is necessary to reposition the working duty cycle set upward (to accommodate increasing load, for example), the current working set of 3 consecutive elements of DQj beginning at DQi would be replaced by a working set of 3 consecutive elements of DQj beginning at DQi+1. A downward adjustment would replace the set beginning at DQi with a set beginning at DQi−1. The three elements of subset DQk are designated DQmin, DQ, and DQmax, ordered from lowest to highest. An illustration of corresponding ON time/OFF time pairs (centered about j=0) is shown below:

| | |
|---|---|
| ONmin = m − 1 | OFFmin = n − m |
| ONdq = m | OFFdq = n − m |
| ONmax = m | OFFmax = n − m − 1 |

As indicated above, the tri-valued output voltage error estimate determines the ON time, adjusting ON by −1, 0, or 0 clocks. The OFF time is determined by adjusting OFF by 0, 0, or −1.

The simplicity of the duty cycle control mechanisms described above is appealing. Moreover, the application of same-cycle, tri-valued output voltage feedback significantly improves static and dynamic performance. While the duty cycle control mechanisms described above have implicit performance limitations similar in nature to those of prior art duty cycle control mechanisms, the effects of duty cycle quantization on performance are substantially reduced, without introducing application dependencies.

Figure 5:
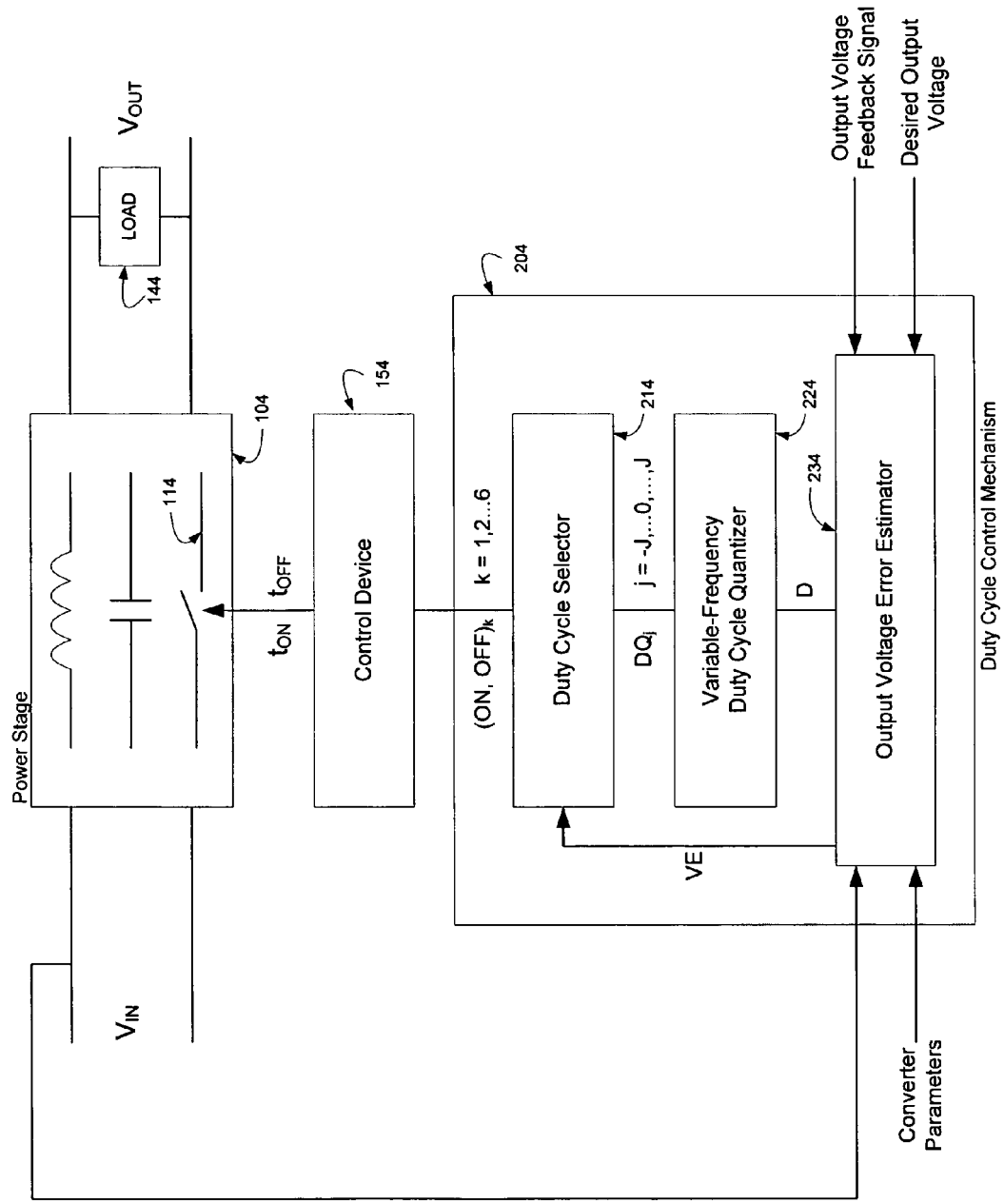
FIG. 5 is a block diagram illustrating a third embodiment of a digital duty cycle control mechanism according to the present invention.

FIG. 5 describes a switched-mode DC/DC power converter according to the present invention, comprising power stage 104 for the purpose of converting input voltage Vin to output voltage Vout; control device 154 for the purpose of turning ON and turning OFF the controllable switching device 114, included in power stage 104; and duty cycle control mechanism 204 for controlling the duty cycle of switching device 114.

The control device 154 is further characterized in that, owing to the temporal resolution of the control device, $\Delta t$, both the turn ON and turn OFF times of the controllable switching device are constrained to be integral multiples of $\Delta t$. Because control device 154 is not a fixed-frequency control device, it must input ON times and OFF times in order to turn ON and turn OFF switching device 114.

The duty cycle control mechanism is comprised of an output voltage error estimator 234, a mechanism for estimating, from an output voltage error signal, the uncorrupted output voltage error, VE; a variable-frequency duty cycle quantizer 224 for determining, from Dmin and Dmax, duty cycles defining the minimum and maximum duty cycles essential to maintain the desired output voltage (Vdo) over the anticipated range of line and load variation, a first set of six or more quantized duty cycles (DQj j=−J, . . . −1, 0, 1, . . . J, ordered from lowest to highest), and suitable for regulating the output voltage over the anticipated range of line and load variation; and an output-voltage-error-estimate-driven duty cycle selector 214, for determining the turn OFF and turn ON times of switching device 114 by choosing, cycle by cycle, a quantized duty cycle (and its corresponding ON time/OFF time pair) from a second set of six quantized duty cycles (DQmin, DQmn, DQn, DQx, DQmx, and DQmax, ordered from lowest to highest), derived from the first set of quantized duty cycles DQj, choosing in such a manner that the amplitude of the output voltage error is continually minimized.

In a digital implementation, the output voltage error estimator 234 may be implemented as a PID filter. PID filters provide the possibility of trading off delay for improved signal-to-noise ratio. Where delay must be minimized, and both static and dynamic response are important, a more precise output voltage error estimate, derived from multiple samples, may be appropriate. Such is the nature of output voltage error estimator 234. Furthermore, in duty cycle control mechanism 204, the estimate of the output voltage error is sampled by duty cycle selector 214 ONCE, via a ternary comparator, after the turn ON time but before the turn OFF time has been determined, and sampled AGAIN, via a binary comparator, after the turn OFF time but before the final determination of duty cycle, and its implied turn ON time. The duty cycle selector 214 applies the first sample to limit the choice of duty cycles, and in so doing determines the turn OFF time; and applies the second sample to choose, finally, the duty cycle, and in so doing determines the turn ON time, marking the end of the switching cycle. Both choices are made immediately on sampling, in time to effect the turn OFF and the turn ON implicit in the chosen duty cycle.

For a buck converter, where the output voltage error excursions are symmetric with respect to the mean, the output voltage error estimate may be derived straightforwardly by sampling the output voltage error via ternary and binary comparators. The sampling times are determined by averaging the ON and OFF times of DQmin and DQmax. The first sampling time, referenced to the turn ON time, is set equal to ¼ (ONmin+ONmax) rounded up (if necessary) to the nearest multiple of $\Delta t$; the second sampling time, referenced to the turn OFF time, is set equal to ¼ (OFFmin+OFFmax) rounded up (if necessary) to the nearest multiple of $\Delta t$. The computation of the sampling times must be done as often as DQ changes.

(It is noted here that the tri-valued output voltage error estimate could also be constructed from two bi-valued samples separated in time but specified such that in the steady state, one sample would normally be positive and the other negative. Further, it is noted that in the event two bi-valued samples were used to obtain a tri-valued output voltage error estimate, the tri-valued estimate could be scheduled during switch ON when DT>0.5 and during switch OFF when DT<0.5. In this case the bi-valued estimate would be scheduled during switch ON when DT<0.5 and during switch OFF when DT>0.5.)

For a boost converter, where the output voltage error excursions are not symmetric with respect to the mean, the derivation of an output voltage error estimate is not as straightforward. In this case, a tri-valued output voltage error estimate is most easily constructed from two bi-valued samples of the output voltage error, separated in time but specified such that in the steady state, one sample would normally be positive and the other negative. For example, the first sample could be taken ¼ (OFFmin+OFFmax) after the turn OFF time (prior to the start of a switching cycle), and the second sample ¼ (ONmin+ONmax) after the succeeding turn ON time (marking the start of a switching cycle), enabling an output voltage error estimate to be constructed and a duty cycle chosen in time to effect the turn OFF implicit in the chosen duty cycle. If both of these samples are positive, the error estimate is positive; if both samples are negative, the error estimate is negative. If one sample is positive and the other negative, the error estimate is zero (neither positive nor negative).

Where it is necessary to further limit the boost converter's output voltage error, the foregoing logic may be modified so that if one sample is positive and the other negative, the output voltage error estimate is determined by evaluating the difference in the value of the output voltage at the second sample from its value in the previous switching cycle. If the difference is positive (the current value is greater than the previous value), the error estimate is positive; if the difference is negative, the error estimate is negative; if the difference is zero, the error estimate is zero (neither positive nor negative).

Whether buck or boost, the duty cycle selector 214 chooses, cycle by cycle, DQmin, DQmn, DQn, DQx, DQmx, or DQmax (and its corresponding ON time/OFF time pair); choosing DQmin when the aggregate output voltage error estimate is highest, DQmax when the aggregate output voltage error estimate is lowest, and one of the remaining intermediate duty cycles when the aggregate output voltage error is one of the corresponding intermediate values.

The determination of the set DQj for specified duty cycles Dmin and Dmax is accomplished by the variable-frequency duty cycle quantizer 224 via a three-step process: the first step being the enumeration of quantized duty cycles in the neighborhood of D where D is the mean of Dmin and Dmax, the second step being the determination of the quantized duty cycle closest to D, and the third step being the selection of DQj from the enumerated possibilities. The systematic enumeration of quantized duty cycles is accomplished by generating a set of quantized ON time/OFF time pairs characterized in that the sum of the quantized ON time and OFF time of each pair is constrained to a set of discrete values {Tswi} (i=1, 2, . . . I) where I is a positive integer and Tswi is an integral multiple of $\Delta t$. This set of quantized pairs is trivially transformed into a set of quantized duty cycles. More switching cycle possibilities translates to more duty cycle possibilities in the neighborhood of D, improving the effective temporal resolution of control device 154.

From the enumerated possibilities, the duty cycle closest to D is designated DQ0. Generating the set DQj from the enumerated possibilities can be accomplished in a variety of ways, consistent with the constraint on the sum of the quantized ON time and OFF time of each ON time/OFF time pair, described above. To illustrate, assume that the set of allowable switching cycles {Tswi} contains 3 elements: (n−1)×$\Delta t$, n×$\Delta t$, and (n+1)×$\Delta t$. Assume further that DQ0=m/n. A very simple expansion about DQ0 could be performed by setting DQj=(m+j)/n. To provide finer resolution, DQj could be set as follows:

|      |                              |                |
|------|------------------------------|----------------|
|      | DQj = (m + (j − 1)/2)/(n − 1) | if j is odd    |
| and  | DQj = (m + j/2)/n             | if j is even   |
| or   | DQj = (m + (j + 1)/2)/(n + 1) | if j is odd    |
| and  | DQj = (m + j/2)/n             | if j is even.  |

Or, to provide still finer resolution, DQj could be constructed from the union of these two sets (with the elements reordered and relabeled). Duty cycle quantizer 224 constructs DQj from the union of these two sets. J is set to the smallest value of j for which (m+(j−1)/2)/(n−1) is greater than Dmax, insuring that elements of DQj are small enough and large enough to maintain Vout over the range of anticipated line and load variation. At J=5, the number of duty cycles available to the duty cycle selector 214 is 17, ranging from (m−3)/(n−1) to (m+3)/(n+1).

From the set DQj, duty cycle selector 214 culls the elements whose implied switching cycle equals n clocks and relabels the remaining elements to form set DQjj jj=1, 2, . . . , JJ where JJ=2×(J+1) if J is odd and 2×J if J is even.

Working sets DQk are then constructed as sets of 6 consecutive elements of DQjj, beginning with an even element, and adjusted (upward or downward) by the duty cycle selector, by two DQjj positions, for variations in line voltage (Vin) as well as the load-dependent effects of parasitics. The six elements of subset DQk are designated DQmin, DQmn, DQn, DQx, DQmx and DQmax, ordered from lowest to highest. An illustration of corresponding ON time/OFF time pairs (centered about $j=\pm 1$) is shown below:

| | |
|---|---|
| ONmin = m − 1 | OFFmin = n − m + 2 |
| ONmn = m − 1 | OFFmn = n − m |
| ONn = m | OFFn = n − m + 1 |
| ONx = m | OFFx = n − m − 1 |
| ONmx = m + 1 | OFFmx = n − m |
| ONmax = m + 1 | OFFmax = n − m − 2 |

As indicated above, the tri-valued output voltage error estimate determines the ON time, adjusting ON by −1, 0, or +1 clocks. The second, bi-valued estimate determines the OFF time, adjusting OFF by +2, +1, 0, −1, or −2 clocks, depending on the values of both estimates. These values allow the converter to respond more rapidly to changes in line and load conditions, while limiting output voltage error in the steady state.

The simplicity of the duty cycle control mechanism described above is appealing. Moreover, the application of twice-in-the-same-cycle output voltage feedback further improves static and dynamic performance. While the duty cycle control mechanism described above has implicit performance limitations similar in nature to those of prior art duty cycle control mechanisms, the effects of duty cycle quantization on performance are substantially reduced, without introducing application dependencies.

Operation at Light Load

While the foregoing duty cycle control mechanisms (implementing the PWM paradigm) are capable of providing effective output voltage regulation while the power converter is operating in continuous conduction mode, provision for efficient operation at light load often requires the addition of a low-power or power-saving duty cycle control mechanism for regulating output voltage when the power converter transitions to discontinuous conduction mode. Mechanisms for regulating in discontinuous conduction mode (DCM) generally implement the pulse frequency modulation (PFM) paradigm, wherein the controllable switch is turned ON, for a fixed period, whenever the output voltage drops below a prescribed voltage level. (Generally, this prescribed voltage level is the desired output voltage, Vdo. In some applications, however, this prescribed voltage level is set above Vdo, during periods of light load, so that droop resulting from the abrupt resumption of load is minimized. And in a few high-power applications, the prescribed voltage level is varied formulaically with load.) In this case, it is necessary to devise a mechanism to detect the transition into and out of DCM, and, in that event, to effect a smooth transition from one duty cycle control mechanism to the other. Such a transition mechanism must handle abrupt as well as gradual changes in load.

When the load is gradually reduced, a persistent rise in the output voltage may result in one or more adjustments of the working set of duty cycles, until at some point the converter detects the transition from CCM to DCM. At this point, the ON time is fixed and the OFF time varied in accordance with the PFM paradigm. When the load is abruptly reduced, the abrupt rise in output voltage triggers a threshold detection mechanism. In this case, the transition from PWM to PFM is effected immediately by turning the switch OFF until Vout drops below Vdo, whereupon ON time is fixed and the OFF time varied in accordance with the PFM paradigm, pending an indication that the converter has transitioned from CCM to DCM.

Once in PFM mode, the switching frequency becomes load-dependent. At very light loads, the switching frequency may approach the audible range. To eliminate objectionable audible noise, the ON time, fixed at the onset of PFM, may have to be decreased subsequently to avoid objectionable audible noise.

Abrupt Resumption of Load (Slam)

The abrupt resumption of load (from a light-load state) presents the more serious challenge to designers of power supply regulators. In the case of a buck converter, for example, the slam is typically detected when the slam-induced droop in the output voltage triggers a threshold detection mechanism. The recovery, which often involves transitioning from PFM to PWM, is then accomplished by turning the switch ON and cycling it intelligently (to minimize objectionable transient behavior) until the converter is able to supply the new load at the desired output voltage via the PWM duty cycle control mechanism.

A modified implementation of the PFM paradigm, herein referred to as MPFM, enables a smooth transition to PWM in the event of an abrupt resumption of load from a light-load state. In MPFM, the switch is turned ON whenever Vout drops below the prescribed voltage level, and is held ON for a fixed period OR, in the case that Vout remains below the prescribed voltage level after the fixed period, is held ON until Vout rises above the prescribed voltage level. When an abrupt resumption of load is detected, the switch is turned ON, the transition to MPFM is effected (in the event the converter was operating in PWM), and the prescribed voltage level is reset (as appropriate). After one or more cycles of MPFM, the converter is able to supply the new load at the desired output voltage via the PWM duty cycle control mechanism.

In the case of a boost converter, however, recovery from an abrupt resumption of load is a bit more complicated than the simple transition described above, owing to the flyback nature of the boost topology. The switch cannot be held ON until the energy stored in the capacitor is sufficient to supply the new load, but must be cycled. One approach to effecting the transition from MPFM to PWM in this case is to transition to PWM immediately on detection of a slam, and then to converge, via a sequence of working sets of duty cycles, to the working set of duty cycles DQk appropriate to the new load. The algorithm described below is illustrative of a class of algorithms effective in converging a "wide" working set of duty cycles to a "narrower" set astride the duty cycle appropriate to precise regulation at the new (higher) load.

This convergence algorithm is initiated whenever an abrupt resumption of load (from a light-load state) is detected. It operates through distinct phases by first "widening" the spread of the working set of duty cycles and then "narrowing" it, where the spread is the difference between the largest and smallest duty cycles in the working set, reflected in the difference between the numerators of the largest and smallest duty cycles, expressed as rationals.

The length of each phase is determined by the length of a "long cycle", which begins and ends when Vout rises above Vdo. During these phases the controller simply selects the low duty cycle of the working set when the output voltage error estimate is positive; the high duty cycle when the output voltage error estimate is negative; and the nominal duty cycle when the output voltage error estimate is zero.

At the end of each phase, the spread of the working set is reduced by 1 through a procedure that attempts to keep the requisite (but unknown) duty cycle centered within the working set. This is accomplished by counting the number of high duty cycle selections (highs) and low duty cycle selections (lows). The current spread of the working duty cycle set is essentially divided into thirds. If highs≧2×lows, then the low duty cycle in the set is adjusted upward by 1 in the numerator, and the high duty cycle is determined by adding the reduced spread to the numerator of the (new) low duty cycle. If lows≧2×highs, then the high duty cycle in the set is adjusted downward by 1 in the numerator, and the low duty cycle is determined by subtracting the reduced spread from the numerator of the (new) high duty cycle.

If neither of the foregoing are true, the requisite duty cycle is deduced to lie in the middle third of the current range. This third is actually split into two sixths. If highs>lows, then the high duty cycle is reduced by an amount less than a full step in the numerator. This is done by incrementing the denominator by one. The low duty cycle is determined by subtracting the reduced spread from the numerator of the (new) high duty cycle. If highs≦lows, then the low duty cycle is increased by an amount less than a full step in the numerator. This is done by decrementing the denominator by one. The high duty cycle is determined by adding the reduced spread to the numerator of the (new) low duty cycle. Special considerations may be made where a "long cycle" is too short or where the denominator must be maintained within a specified range.

Multi-Phase Buck Converters

The inventions detailed in the preceding paragraphs have applicability beyond the single-phase and single-output converters used to illustrate their application. The multi-phase buck converter, which is used to supply precisely regulated power to high-end microprocessors provides an excellent case in point. Because high-end microprocessors draw high current (100 amps is not atypical) at low voltage (1 volt is not atypical), efficiency dictates that current be sourced by multiple buck converters. Furthermore, by operating them synchronously, the output voltage ripple frequency is the product of the per-phase switching frequency and the number of phases, enabling a practical tradeoff between switching losses and the size of the output filter components. In FIGS. 7a and 7b, the switching waveforms of a synchronous three-phase buck converter operating at 1 MHz (333.3 KHz per phase) are described, assuming a 20 MHz clock. In the case Vin=12 volts and Vdo=1.8 volts, the target duty cycle is 9/60. In the case Vin=12 volts and Vdo=1.5 volts, the target duty cycle is 7.5/60, achieved by averaging duty cycles of 7/60 and 8/60. In FIGS. 8a and 8b, the switching waveform of a three-phase buck converter operating at 1 MHz is compared with that of a four-phase buck converter, also operating at 1 MHz.

The application of the foregoing inventions to the control of multi-phase buck converters holds particular promise inasmuch as an all-digital control mechanism greatly facilitates the implementation of critical cross-control processes. All the techniques employed in the control of single-phase buck converters, namely variable-frequency duty cycle quantization, same-cycle output voltage feedback with Bresenham sequencing, and dynamic adjustment of the working duty cycle set, are applicable to the control of the multiple phases of a multi-phase buck converter.

A multi-phase buck converter regulated using the aforementioned techniques would employ a single control device for the purpose of turning ON and turning OFF the several controllable switching devices (one per phase). Its mechanism for estimating output voltage error would generate per-phase output voltage error estimates; that is, during the ON time of each controllable switching device, an output voltage error estimate would be generated for the purpose of regulating the duty cycle of said controllable switching device. Its selector mechanism would choose, for each per-phase error estimate, a quantized ON time/OFF time pair from a working set of quantized ON time/OFF time pairs, and thus determine the turn OFF and turn ON times of said controllable switching device. Subsequent per-phase error estimates would determine the turn OFF and turn ON times of the controllable switching devices associated with subsequent phases. To have a different working set for each phase is inconsistent with minimizing the power loss resulting from possible resistive mismatch between phases; consequently, there is just one working set, and just one mechanism for dynamically adjusting for variations in line and load. The mechanism, in this case, could be identical to any of those described earlier.

With the assumption of a common working set of duty cycles for all phases, the application of the inventions here disclosed is reduced to applying variable-frequency duty cycle quantization while preserving phase synchronization. To this end, a simple cross-regulation mechanism is proposed. To illustrate how such a mechanism might operate, consider a five-phase buck converter operating at 1.666 MHz (333.3 MHz per phase). Assume further that Vin=12 volts and Vdo=1 volt, and the controller is clocked at 40 MHz. Accordingly, the average switching cycle is 120 clocks, and the target duty cycle is 10/120. A working duty cycle set consisting of 9/115 (as the minimum quantized duty cycle), 10/120 (as the nominal quantized duty cycle), and 10/115 (as the maximum quantized duty cycle) would require a cross-regulation mechanism to adjust (as necessary) the timing of preceding phases with the generation of each output voltage error estimate, or the synchronization could be disrupted. With the switching cycles restricted to be divisible by the number of phases (in this case, 5), uniform interleaving is maintained by installing an interval timer for the purpose of controlling the intervals between (temporally) successive switching events and setting its timeout value at each sampling of the output voltage error estimate. For the working set consisting of 9/115, 10/120, and 10/115, the timeout value would be set to 24 when the output voltage error estimate was zero, and, if not zero, set to 23. Should the working set be adjusted to accommodate changes in line or load, the set/reset logic would change accordingly. For example, if the load were to increase, requiring a working set consisting of 10/120, 10/115, and 11/120, the timeout value would be set to 23 when the output voltage error estimate was zero, and, if not zero, set to 24.

Another approach to the challenge of variable-frequency quantization involves the concept of dual ON time/OFF time pairs (derived from dual quantized duty cycles). For each working duty cycle set, the nominal duty cycle is paired with its dual. In the case of the working set consisting of 9/115, 10/120, and 10/115 , the dual of 10/120: namely 9/110 is paired with it, and selected in alternating sequence. When the output voltage error estimate is positive, 9/115 would be selected; when the output voltage error estimate is negative, 10/115 would be selected; when the output voltage error estimate is zero, the selection would alternate between 10/120 and 9/110. By elaborating the nominal duty cycle into a duo, the need for a cross-regulation mechanism is eliminated. (The dual and its corresponding ON time/OFF time pair are determined from all three elements of the working set. The procedure for determining the dual is obvious from the foregoing example.)

Another very attractive way to avoid the need for cross-regulation is to construct working duty cycle sets DQk in such a way as to allow the substitution of a Bresenham Sequence of the minimum and maximum quantized duty cycles for the nominal quantized duty cycle. The construction used in the foregoing example admits to such a substitution.

With multi-phase buck converters, the application of same-cycle feedback is complicated by the fact that isolating the output voltage error of a given phase must be done during the ON time of its switch—normally a very brief time. Because the switch is ON for a very brief time (and OFF for a relatively long time), it is all the more important to be able to act within the ON time. The single sequentially-sampled binary comparator (useful in the simple buck converter to generate a ternary output voltage error estimate) must therefore give way to two simultaneously-sampled binary comparators, positioned above and below the desired output voltage, and biased (as necessary) to offset delays in the switching path.

Finally, the mechanism for the dynamic adjustment of the working duty cycle set as line and load conditions change must not disrupt the synchronization of the several phases. To prevent desynchronization, the adjustment mechanism must not introduce new switching frequencies. For the five-phase example cited earlier, adjustments would logically follow the pattern implicit in the working duty cycle set. For example, the duty cycle set 9/115, 10/120, 10/115 could be adjusted to 10/120, 10/115, 11/120 or to 9/120, 9/115, 10/120.

Current Balancing

Multi-phase buck converters require current sense feedback to insure that the per-phase currents are balanced, initially on startup and dynamically during operation. One mechanism for developing this feedback involves sensing the imbalance between the per-phase inductor currents by comparing each to the average of the per-phase inductor currents; that is, during the ON time of each of the controllable switching devices (one per phase), the current through said switching device would be compared to the average of the per-phase inductor currents. The imbalance so determined, in combination with the output voltage error estimate generated concurrently, is then applied via the duty cycle selector mechanism to correct the imbalance. The result of the interaction of the current sense feedback system with the output voltage feedback system is manifest in the switching waveform of FIG. 9, wherein the ON time in Phase 1 is incremented by 1 clock at every third switching cycle, in order to bring the current of Phase 1 into balance with the currents of Phases 2 and 3.

To illustrate, consider a three-phase converter wherein the phases are designated (in sequence) phase i, phase j, and phase k; the switches are designated switch i, switch j, and switch k; the inductor currents are designated $C_i$, $C_j$, and $C_k$; and the average of the three inductor currents is designated $C_n$ ($C_n = (C_i + C_j + C_k)/3$). Each of the inductor currents is compared to the average inductor current using a binary comparator. During startup of the converter (and periodically during operation, if necessary), the $C_i$ comparator is sampled at consecutive clocks to determine the point (relative to switch ON) that $C_i$ rises above $C_n$. Similarly, the same information is derived for $C_j$ and $C_k$. (To minimize the effect of noise, etc., multiple measurements could be taken, and averaged.) These measurements (of the delay between switch ON and current climb) provide the basis for calibrating the delays in the respective paths through the switches to the resolution of the clock (±12.5 nsec in the case of a 40 MHz clock), enabling the controller to compensate.

To maintain current balance in operation, these comparators are used differently. Midway through the ON time of switch i, an estimate of the imbalance of $C_i$ is generated by comparing $C_i$ and $C_n$ using a ternary comparator registering HIGH, LOW, or NEITHER. If both the ith Current Imbalance Estimate and the contemporaneously generated Output Voltage Error Estimate are HIGH (or LOW, or NEITHER), no extraordinary action is taken to address the imbalance, if any. However, if the ith Current Imbalance Estimate and the contemporaneously generated Output Voltage Error Estimate differ, one from the other, the Output Voltage Error Estimate may be overridden, to correct the imbalance between $C_i$ and $C_n$. Similarly, midway through the ON time of switch j, $C_j$ and $C_n$ are compared; and midway through the ON time of switch k, $C_k$ and $C_n$ are compared.

Finally, the step response of the multi-phase buck converter is critical inasmuch as high end microprocessors impose stringent requirements on undershoot and overshoot. FIG. 10 describes the switching waveforms of a three-phase buck converter operating at light load (off a single phase) when an abrupt increase in load is detected, and all switches are turned ON until the energy imbalance can be corrected. In FIG. 10 the switch in Phase 1 is turned OFF ahead of the switches in Phase 2 and Phase 3, to illustrate that per-phase current limits may impair recovery from a slam when the converter is sourcing current from a single phase. In the event that all phases remain on in light load, the recovery proceeds by turning ON all the switches until the energy imbalance is corrected, and then resynchronizing the several phases, as shown in FIG. 10. In either case, regulating in the digital domain greatly facilitates the implementation of control strategies as well as the resynchronization of the several phases following a step change in load.

I claim:

1. A switched-mode DC/DC converter producing at least one output voltage (Vout), comprising:
   At least one power stage (PS) for the purpose of converting an input voltage (Vin) into an output voltage (Vout), each power stage including at least one controllable switching device (CS); and
   A control device (CD) for the purpose of turning ON and turning OFF said controllable switching device, characterized in that
   Owing to the temporal resolution of the control device, Δt, both the turn ON and turn OFF times of the controllable switching device (CS) are constrained to be integral multiples of Δt; and
   A duty cycle control mechanism (DC) for controlling the duty cycle of said controllable switching device, comprising:
   A mechanism for estimating output voltage error, the output voltage error being the difference between the uncorrupted output voltage and the desired output voltage (Vdo); and
   A selector mechanism (SM) for determining, for the current output voltage error estimate, the turn OFF and turn ON times of said controllable switching device by choosing, cycle by cycle, a quantized ON time/OFF time pair from a working set of at least two quantized ON time/OFF time pairs, suitable for regulating the output voltage, and characterized in that the sum of the quantized ON time and OFF time of each pair (in said working set) is constrained to a set of discrete values {Tswi} (i=1, 2, . . . I) where I is a positive integer and Tswi is an integral multiple of $\Delta t$; choosing in such a manner that the amplitude of the output voltage error is continually minimized; and A mechanism for dynamically adjusting the working set of at least two quantized ON time/OFF time pairs to compensate for variations in input voltage (Vin) as well as the load-dependent effects of parasitics.

2. The converter of claim 1, wherein the mechanism for dynamically adjusting the working set of at least two quantized ON time/OFF time pairs incorporates means for computing a new working set of ON time/OFF time pairs to replace the current working set of ON time/OFF time pairs whenever an adjustment of the (current) working set is effected.

3. The converter of claim 1, wherein the set of at least two ON time/OFF time pairs is a set of exactly 3 pairs, ordered in terms of their implied duty cycles, and designated Low, Nominal, and High, respectively; and wherein the output voltage error estimate is tri-valued: Positive, Zero, and Negative; and wherein the selector mechanism (SM) chooses the Low ON time/OFF time pair when the current output voltage error estimate is Positive, the High ON time/OFF time pair when the current output voltage error estimate is Negative, and the Nominal ON time/OFF time pair when the current output voltage error estimate is Zero.

4. The converter of claim 3, wherein the output voltage error estimate is constructed by sampling the output voltage error through a ternary comparator.

5. The converter of claim 3, wherein the output voltage error estimate is constructed from a pair of samples of the output voltage error obtained by sequentially sampling the output voltage error through a binary comparator; if both samples are Positive, the output voltage error estimate is Positive; if both samples are Negative, the output voltage error estimate is Negative; if one sample is Positive and one sample is Negative, the output voltage error estimate is Zero.

6. The converter of claim 3, wherein the output voltage error estimate is constructed from a pair of samples of the output voltage error obtained by sequentially sampling the output voltage error through a binary comparator: if both samples are Positive, the output voltage error estimate is Positive; if both samples are Negative, the output voltage error estimate is Negative; if one sample is Positive and one sample is Negative, the output voltage error estimate is determined by evaluating the change in the value of the output voltage at the second sample from the value recorded in the previous switching cycle; if the change is positive (the current value is greater than the previous value), the output voltage error estimate is Positive; if the change is negative, the output voltage error estimate is Negative; if there is no change, the output voltage error estimate is Zero.

7. The converter of claim 1, wherein the set of at least two ON time/OFF time pairs is a set of exactly 2 pairs, ordered in terms of their implied duty cycles, and designated Low and High, respectively; and wherein the output voltage error estimate is tri-valued: Positive, Zero, and Negative; and wherein the selector mechanism (SM) chooses the Low ON time/OFF time pair when the current output voltage error estimate is Positive, the High ON time/OFF time pair when the current output voltage error estimate is Negative, and a Bresenham Sequence of the Low pair and the High pair when the current output voltage error estimate is Zero.

8. The converter of claim 7, wherein the Bresenham Sequence Generator implements a form of Bresenham's Algorithm.

9. The converter of claim 1, wherein the output voltage error estimate is constructed using a digital filter.

10. A multi-phase buck converter producing at least one output voltage (Vout), comprising:

Two or more interleaved power stages (PS) for the purpose of converting an input voltage (Vin) into an output voltage (Vout), each power stage including at least one controllable switching device (CS); and A control device (CD) for the purpose of turning ON and turning OFF said controllable switching devices (CS), characterized in that Owing to the temporal resolution of the control device, $\Delta t$, both the turn ON and turn OFF times of the controllable switching devices (CS), as well as the intervals between the turn ON times of the several controllable switching devices, are constrained to be integral multiples of $\Delta t$; and A duty cycle control mechanism (DC) for controlling the duty cycles of said controllable switching devices, comprising:

A mechanism for estimating per-phase output voltage error, the per-phase output voltage error being the difference between the uncorrupted output voltage and the desired output voltage (Vdo); and A selector mechanism (SM) for determining, for the current per-phase output voltage error estimate, the turn OFF and turn ON times of the associated controllable switching device by choosing, cycle by cycle, a quantized ON time/OFF time pair from a working set of at least two quantized ON time/OFF time pairs, suitable for regulating the output voltage, and characterized in that the sum of the quantized ON time and OFF time of each pair (in said working set) is constrained to a set of discrete values {Tswi } (i=1, 2, . . . I) where I is a positive integer and Tswi is an integral multiple of $\Delta t$; choosing in such a manner that the amplitude of the output voltage error is continually minimized, and A mechanism for dynamically adjusting the working set of at least two quantized ON time/OFF time pairs to compensate for variations in input voltage (Vin) as well as the load-dependent effects of parasitics.

11. A switched-mode DC/DC converter producing at least one output voltage (Vout), comprising:

At least one power stage (PS) for the purpose of converting an input voltage (Vin) into an output voltage (Vout), each power stage including at least one controllable switching device (CS); and A control device (CD) for the purpose of turning ON and turning OFF said controllable switching device, characterized in that Owing to the temporal resolution of the control device, $\Delta t$, both the turn ON and turn OFF times of the controllable switching device (CS) are constrained to be integral multiples of $\Delta t$; and A duty cycle control mechanism (DC) for controlling the duty cycle of said controllable switching device, comprising:

A mechanism for estimating output voltage error, the output voltage error being the difference between the uncorrupted output voltage and the desired output voltage (Vdo); and A selector mechanism (SM) for determining, for the current output voltage error estimate, the turn OFF and turn ON times of said controllable switching device by choosing, cycle by cycle, a quantized ON time/OFF time pair from a working set of at least two quantized ON time/OFF time pairs, suitable for regulating the output voltage, and characterized in that the sum of the quantized ON time and OFF time of each pair (in said working set) is constrained to a set of discrete values $\{ Tswi \}$ (i=1, 2, . . . I) where I is a positive integer and Tswi is an integral multiple of $\Delta t$; choosing in such a manner that the amplitude of the output voltage error is continually minimized.

\* \* \* \* \*